(12) United States Patent
Aiki

(10) Patent No.: US 10,302,946 B2
(45) Date of Patent: May 28, 2019

(54) DISPLAY APPARATUS

(71) Applicant: Sony Corporation, Tokyo (JP)

(72) Inventor: Kazuma Aiki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/901,192

(22) PCT Filed: Apr. 30, 2014

(86) PCT No.: PCT/JP2014/061988
§ 371 (c)(1),
(2) Date: Dec. 28, 2015

(87) PCT Pub. No.: WO2015/001839
PCT Pub. Date: Jan. 8, 2015

(65) Prior Publication Data
US 2016/0154243 A1    Jun. 2, 2016

(30) Foreign Application Priority Data
Jul. 4, 2013    (JP) .................................. 2013-140693

(51) Int. Cl.
*G02B 27/01*    (2006.01)
*G02B 17/00*    (2006.01)
(Continued)

(52) U.S. Cl.
CPC ......... *G02B 27/0172* (2013.01); *G02B 17/00* (2013.01); *G02B 27/0176* (2013.01);
(Continued)

(58) Field of Classification Search
CPC . G02F 2203/26; H04B 10/508; H04B 10/505; H01S 3/0057
See application file for complete search history.

(56) References Cited

U.S. PATENT DOCUMENTS 6,464,363 B1    10/2002    Nishioka et al.
6,563,648 B2 *    5/2003    Gleckman .......... G02B 27/0172
                                                         359/630
(Continued)

FOREIGN PATENT DOCUMENTS

CN    101410745 A    4/2009
CN    102004316 A    4/2011
(Continued)

OTHER PUBLICATIONS

Chinese Office Action dated Sep. 8, 2017 in connection with Chinese Application No. 201480002827.4 and English translation thereof.

*Primary Examiner* — Joseph P Martinez
*Assistant Examiner* — Vipin Patel
(74) *Attorney, Agent, or Firm* — Wolf, Greenfield & Sacks, P.C.

(57) ABSTRACT

A display apparatus includes: a frame 10 to be mounted on the head of a viewer; and an image display device 100 attached to the frame 10. The image display device 100 includes: an image forming device 111; and an optical device 120 that guides an image from the image forming device 111 to an eye of the viewer. The optical device 120 includes: a first deflecting unit 130 that deflects the image from the image forming device 111; and a second deflecting unit 140 that deflects the image deflected by the first deflecting unit 130, toward the eye 21 of the viewer. A light reflecting member 151 is further provided to face the image forming device 111, with the optical device 120 being interposed between the image forming device 111 and the light reflecting member 151. Light emitted from the image forming device 111 passes through the optical device 120, is reflected by the light reflecting member 151, reenters the (Continued)

optical device 120, and is deflected by the first deflecting unit 130.

13 Claims, 25 Drawing Sheets

(51) Int. Cl.
 *G02B 6/00* (2006.01)
 *G02B 26/10* (2006.01)
(52) U.S. Cl.
 CPC .............. *G02B 6/00* (2013.01); *G02B 26/105* (2013.01); *G02B 2027/0118* (2013.01); *G02B 2027/0152* (2013.01)

(56) References Cited

U.S. PATENT DOCUMENTS

| | | | |
|---|---|---|---|
| 7,418,170 B2* | 8/2008 | Mukawa | G02B 6/0033 359/15 |
| 7,905,603 B2* | 3/2011 | Freeman | G02B 5/1814 353/122 |
| 8,446,675 B1 | 5/2013 | Wang et al. | |
| 8,570,242 B2 | 10/2013 | Chosokabe et al. | |
| 8,861,090 B2 | 10/2014 | Mukawa | |
| 8,907,865 B2 | 12/2014 | Miyawaki et al. | |
| 8,976,453 B2 | 3/2015 | Akutsu et al. | |
| 8,988,315 B2 | 3/2015 | Mukawa et al. | |
| 9,016,864 B2 | 4/2015 | Sasazaki et al. | |
| 9,164,221 B2 | 10/2015 | Akutsu et al. | |
| 9,201,242 B2 | 12/2015 | Miyawaki et al. | |
| 9,311,752 B2 | 4/2016 | Chosokabe et al. | |
| 9,451,244 B2 | 9/2016 | Sasazaki et al. | |
| 9,488,846 B2 | 11/2016 | Hayashi | |
| 9,558,540 B2 | 1/2017 | Mukawa | |
| 9,569,897 B2 | 2/2017 | Miyawaki et al. | |
| 9,658,456 B2 | 5/2017 | Mukawa | |
| 9,709,809 B2 | 7/2017 | Miyawaki et al. | |
| 9,726,890 B2 | 8/2017 | Akutsu et al. | |
| 9,753,284 B2 | 9/2017 | Machida et al. | |
| 9,759,920 B2 | 9/2017 | Akutsu et al. | |
| 9,766,453 B2 | 9/2017 | Mukawa | |
| 9,791,701 B2 | 10/2017 | Ato et al. | |
| 2001/0010598 A1 | 8/2001 | Aritake et al. | |
| 2003/0107816 A1 | 6/2003 | Takagi et al. | |
| 2006/0132914 A1* | 6/2006 | Weiss | G02B 5/32 359/462 |
| 2007/0188837 A1 | 8/2007 | Shimizu et al. | |
| 2008/0278812 A1* | 11/2008 | Amitai | G02B 6/00 359/485.05 |
| 2011/0051076 A1 | 3/2011 | Sugihara et al. | |
| 2011/0241975 A1 | 10/2011 | Mukawa et al. | |
| 2011/0248904 A1 | 10/2011 | Miyawaki et al. | |
| 2011/0248905 A1 | 10/2011 | Chosokabe et al. | |
| 2012/0044571 A1 | 2/2012 | Mukawa | |
| 2012/0127434 A1 | 5/2012 | Sasazaki et al. | |
| 2012/0206817 A1 | 8/2012 | Totani et al. | |
| 2013/0088415 A1 | 4/2013 | Totani et al. | |
| 2013/0128611 A1 | 5/2013 | Akutsu et al. | |
| 2013/0135749 A1 | 5/2013 | Akutsu et al. | |
| 2013/0242555 A1 | 9/2013 | Mukawa | |
| 2013/0300766 A1 | 11/2013 | Mukawa | |
| 2014/0022284 A1 | 1/2014 | Chosokabe et al. | |
| 2014/0334010 A1 | 11/2014 | Mukawa | |
| 2014/0340286 A1 | 11/2014 | Machida et al. | |
| 2014/0347252 A1 | 11/2014 | Miyawaki et al. | |
| 2015/0062699 A1 | 3/2015 | Hayashi | |
| 2015/0109679 A1 | 4/2015 | Mukawa et al. | |
| 2015/0138647 A1 | 5/2015 | Akutsu et al. | |
| 2015/0226970 A1 | 8/2015 | Mukawa | |
| 2015/0229897 A1 | 8/2015 | Mukawa | |
| 2015/0260994 A1 | 9/2015 | Akutsu et al. | |
| 2015/0260995 A1 | 9/2015 | Mukawa | |
| 2015/0269784 A1 | 9/2015 | Miyawaki et al. | |
| 2015/0277125 A1 | 10/2015 | Hirano et al. | |
| 2015/0277126 A1 | 10/2015 | Hirano et al. | |
| 2015/0288954 A1 | 10/2015 | Sasazaki et al. | |
| 2015/0338660 A1 | 11/2015 | Mukawa | |
| 2015/0346494 A1 | 12/2015 | Tanaka et al. | |
| 2015/0362735 A1 | 12/2015 | Akutsu et al. | |
| 2015/0370075 A1 | 12/2015 | Ato et al. | |
| 2016/0041394 A1 | 2/2016 | Tanaka et al. | |
| 2016/0062123 A1 | 3/2016 | Tanaka et al. | |
| 2016/0097931 A1 | 4/2016 | Takahota et al. | |
| 2016/0147069 A1 | 5/2016 | Tanaka et al. | |
| 2017/0069140 A1 | 3/2017 | Mukawa | |
| 2017/0115492 A1 | 4/2017 | Miyawaki et al. | |
| 2017/0184857 A1 | 6/2017 | Ato et al. | |
| 2017/0322420 A1 | 11/2017 | Machida et al. | |

FOREIGN PATENT DOCUMENTS

| | | |
|---|---|---|
| CN | 102645748 A | 8/2012 |
| CN | 203012240 U | 6/2013 |
| JP | 2000-180783 A | 6/2000 |
| JP | 2001-290102 A | 10/2001 |
| JP | 2003-149591 A | 5/2003 |
| JP | 2005-316304 A | 11/2005 |
| JP | 2006-162767 A | 6/2006 |
| JP | 2007-094175 A | 4/2007 |
| JP | 2007-219106 A | 8/2007 |
| JP | 2011-053367 A | 3/2011 |
| JP | 2013-083745 A | 5/2013 |
| WO | WO 2007/093983 A2 | 8/2007 |

* cited by examiner

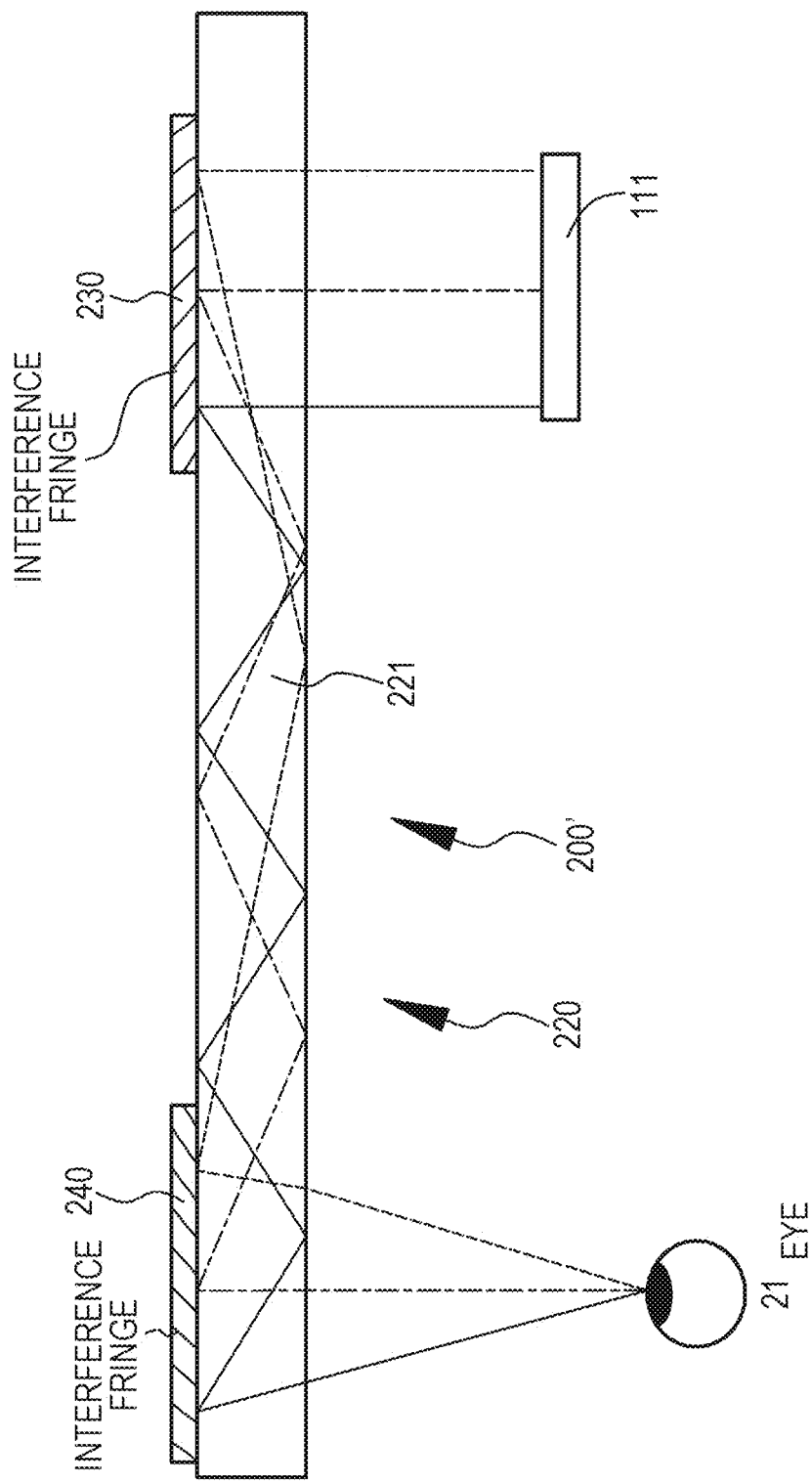

DISPLAY APPARATUS

TECHNICAL FIELD

The present disclosure relates to display apparatuses, and more particularly, to a display apparatus that is suitable for use in a head mounted display (HMD).

BACKGROUND ART

A virtual image display device (an image display device) for presenting a two-dimensional image formed by an image forming device as an enlarged virtual image to a viewer through a virtual image optical system is known from JP 2006-162767 A, for example. As shown in the conceptual diagram in FIG. 24, this image display device 100' includes: an image forming device 111 having pixels arranged in a two-dimensional matrix; and an optical device (a light guiding unit) 120 that receives light emitted from the pixels of the image forming device 111, and guides and emits the light. The optical device 120 includes: a light guide panel 121 that causes incident light to propagate therein by total reflection, and then emits the light; a first deflecting unit 130 (formed with a single light reflecting film, for example) that reflects the light that has entered the light guide panel 121 so that the light that has entered the light guide panel 121 is totally reflected inside the light guide panel 121; and a second deflecting unit 140 (formed with a multi-layer light reflecting film having a multi-layer stack structure, for example) that causes the light having propagated inside the light guide panel 121 by total reflection to exit from the light guide panel 121. If an HMD is formed with such an image display device 100', the weight and the size of the apparatus can be reduced.

Also, a virtual image display device (an image display device) that uses hologram diffraction gratings to present a two-dimensional image formed by an image forming device as an enlarged virtual image to a viewer through a virtual image optical system is known from JP 2007-094175 A, for example. As shown in the conceptual diagram in FIG. 25, this image display device 200' basically includes an image forming device 111 that displays an image, and an optical device (a light guiding unit) 220 that receives light displayed on the image forming device 111 and guides the light to an eye 21 of a viewer. Here, the optical device 220 includes a light guide panel 221, and a first diffraction grating member 230 and a second diffraction grating member 240 that are formed with reflective volume hologram diffraction gratings provided on the light guide panel 221.

As an image is displayed on the image display device 100' or 200', a viewer can see the displayed image superimposed on an external image.

CITATION LIST

Patent Document

Patent Document 1: JP 2006-162767 A
Patent Document 2: JP 2007-094175 A

SUMMARY OF THE INVENTION

Problems to be Solved by the Invention

In the image display devices 100' and 200' disclosed in these patent application publications, the image forming devices 111 are placed on the viewer sides of the light guide panels 121 and 221. That is, each image forming device 111 is placed on a side and in the vicinity of the head of a viewer. Therefore, the degree of freedom in arranging the image forming devices 111 is low.

In view of the above, the present disclosure aims to provide a display apparatus having a configuration and a structure that can increase the degree of freedom in arranging components.

Solutions to Problems

To achieve the above object, a display apparatus of the present disclosure includes
(a) a frame to be mounted on the head of a viewer; and
(b) an image display device attached to the frame,
wherein
the image display device includes:
(A) an image forming device; and
(B) an optical device that guides an image from the image forming device to an eye of the viewer,
the optical device includes: a first deflecting unit that deflects the image from the image forming device; and a second deflecting unit that deflects the image deflected by the first deflecting unit, toward the eye of the viewer,
a light reflecting member is further provided to face the image forming device, with the optical device being interposed between the image forming device and the light reflecting member, and
light emitted from the image forming device passes through the optical device, is reflected by the light reflecting member, reenters the optical device, and is deflected by the first deflecting unit.

Effects of the Invention

As the display apparatus of the present disclosure includes the light reflecting member positioned so that the optical device is interposed between the image forming device and the light reflecting member, the degree of freedom in arranging the image forming device can be increased. The advantageous effects described in this specification are merely examples and do not limit the invention, and other advantageous effects may also be achieved.

BRIEF DESCRIPTION OF DRAWINGS

FIG. 25 is a conceptual diagram of an image display device in a modification of the conventional display apparatus.

MODES FOR CARRYING OUT THE INVENTION

Figure 1:
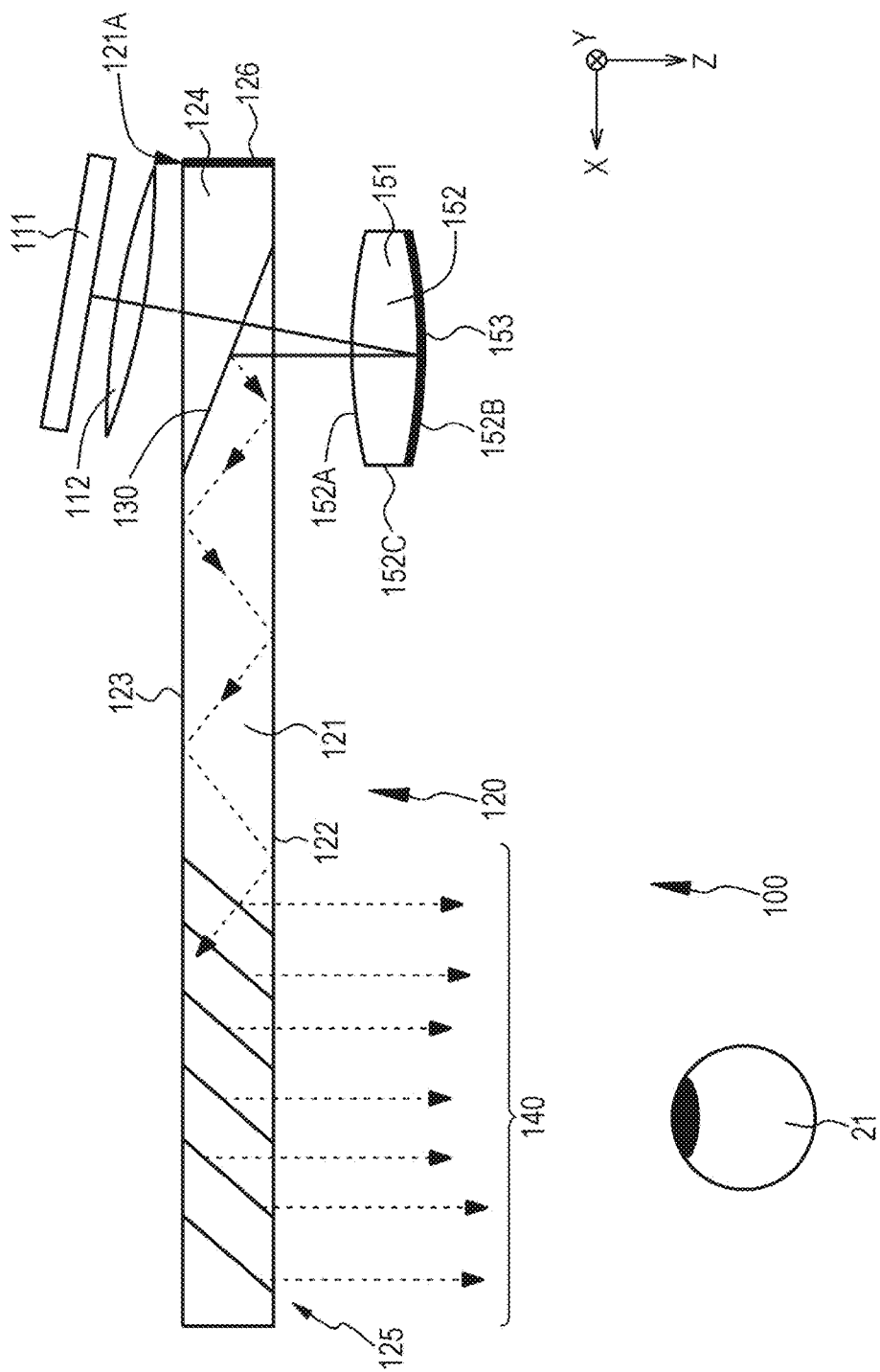
FIG. 1 is a conceptual diagram of a display apparatus of Example 1.

The following is a description of the present disclosure based on embodiments, with reference to the drawings. However, the present disclosure is not limited to the embodiments, and the various numerical values and materials mentioned in the embodiments are merely examples. Explanation will be made in the following order.

1. General description of a display apparatus of the present disclosure
2. Example 1 (a display apparatus of the present disclosure, a display apparatus with the first structure, and an image forming device with the first structure)
3. Example 2 (a modification of Example 1)
4. Example 3 (another modification of Example 1)
5. Example 4 (modifications of Examples 1 through 3, and a display apparatus with the second structure)
6. Example 5 (modifications of Examples 1 through 4, and an image forming device with the second structure)
7. Example 6 (modifications of Examples 1 through 5)
8. Example 7 (a modification of Example 6)
9. Example 8 (modifications of Examples 6 and 7) and others

[1. General Description of a Display Apparatus of the Present Disclosure]

In the description below, where light that has been emitted from a middle portion of an image forming device, has passed through a light guide panel, has been reflected by a light reflecting member enters the light guide panel at a point that is the light guide panel incidence center point, the axis line of the light guide panel that extends through the light guide panel incidence center point is the X-axis (the direction from a first deflecting unit toward a second deflecting unit being the positive direction), and the normal line of the light guide panel that extends through the light guide panel incidence center point is the Z-axis (the direction toward the viewer side being the positive direction). In other words, the horizontal direction of an image is the X-direction, and the vertical direction is the Y-direction. Where light that has been emitted from a middle portion of an image forming device enters a light reflecting member at a point that is the light reflecting member incidence center point, the axis line of the light reflecting member that extends through the light reflecting member incidence center point and is parallel to the X-axis is the x-axis, and the normal line of the light reflecting member that extends through the light reflecting member incidence center point is the z-axis. Further, light that has been emitted from an image forming device, has passed through a light guide panel, has been reflected by a light reflecting member, has reentered the light guide panel, and has collided with a first deflecting unit will be called "light reflecting member colliding light" in some cases, for ease of explanation. The term "total reflection" means total internal reflection or total reflection inside a light guide panel.

In a display apparatus of the present disclosure, a light reflecting member may be formed with an optical member including a first surface into and from which light from an image forming device is guided and emitted, and a second surface located on the opposite side from the first surface, a light reflecting layer being formed on the second surface. In this case, the first surface and the second surface may be formed with adjustable surfaces. More specifically, the external shape of the optical member forming the light reflecting member may be a thick lens-like shape, for example. That is, the optical member may have an external shape formed with the first surface, the second surface, and side surfaces. Light that enters the light reflecting member having such a shape is first subjected to lens action when entering the first surface, is subjected to lens action when reflected by the second surface, and is further subjected to lens action when exiting from the first surface. However, the light reflecting member is not limited to the above, and a reflecting mirror may be used, for example. The adjustable surfaces are preferably asymmetrical in the x-z plane, and are preferably symmetrical in the y-z plane. An adjustable surfaces z=f(x, y) is normally expressed by a polynomial in x and y. Here, $C_{ij}$ is a coefficient.

$$f(x, y) = \Sigma (C_{ij}) \times (x^i) \times (y^j)$$

Since a shape that is symmetrical about the y-direction needs to be formed, the coefficient is invariably "0" when y is an odd number. Also, sufficient performance is achieved when the value of (i+j) is approximately 10. What kind of adjustable surface is to be employed should be determined by conducting optical simulations and various tests.

The optical member may be formed with glass containing optical glass such as silica glass and BK7, or a plastic material (such as PMMA, polycarbonate resin, acrylic resin, non-crystalline polypropylene resin, or styrene resin including AS resin). The optical member may be formed by a known technique such as a forming technique using a metal mold or the like. As the external shape of the optical member is a thick lens-like shape, portions with uneven thickness are reduced, and accordingly, excellent formability can be achieved. Also, production costs can be lowered. The light reflecting layer is formed with a material that can effectively reflect light, such as a thin silver film or a thin aluminum film, and the light reflecting layer is formed by a known technique such as a vacuum deposition method.

In a display apparatus of the present disclosure including the above described various preferred modes, an optical device may include:

(B-1) a light guide panel that causes incident light to propagate therein by total reflection, and emits the light;

(B-2) a first deflecting unit; and (B-3) a second deflecting unit that deflects, more than once, the light that has propagated inside the light guide panel by total reflection, and causes the light to exit the light guide panel, a light reflecting member may be placed to face an image forming device, with the light guide panel being interposed between the light reflecting member and the image forming device, and light emitted from the image forming device may pass through the light guide panel, be reflected by the light reflecting member, reenter the light guide panel, and be deflected by the first deflecting unit so as to be totally reflected inside the light guide panel.

In the above described preferred structure of a display apparatus of the present disclosure, the light reflecting member may be placed on the viewer side of the light guide panel. A display apparatus with such a structure will be hereinafter referred to as a "display apparatus with the first structure", for ease of explanation. In a display apparatus with the first structure, the image forming device is placed in a position away from the head of the viewer. Accordingly, the degree of freedom in determining the position of the image forming device can be increased, and furthermore, the viewer will not feel discomfort due to heat generated from the image forming device. Alternatively, the image forming device may be placed on the viewer side of the light guide panel. A display apparatus with such a structure will be hereinafter referred to as a "display apparatus with the second structure", for ease of explanation.

Furthermore, in each of the above described various preferred structures of the display apparatus of the present disclosure, the image forming device is preferably nonparallel to the light guide panel, so as to reduce astigmatism, improve MTF, and restrain generation of stray light from reflected light. Alternatively, the light reflecting member is preferably nonparallel to the light guide panel. Alternatively, the image forming device is preferably nonparallel to the light guide panel, and the light reflecting member is preferably nonparallel to the light guide panel. The light guide panel being nonparallel to the image forming device, or the light guide panel being nonparallel to the light reflecting member means that the light guide panel and the image forming device, or the light guide panel and the light reflecting member have nonparallel cut sections when cut along the X-Z plane or a plane parallel to the X-Z plane, and have parallel cut sections when cut along the Y-Z plane or a plane parallel to the Y-Z plane. Meanwhile, the light guide panel being parallel to the image forming device, or the light guide panel being parallel to the light reflecting member means that the light guide panel and the image forming device, or the light guide panel and the light reflecting member have parallel cut sections when cut along the X-Z plane or a plane parallel to the X-Z plane, and have parallel cut sections when cut along the Y-Z plane or a plane parallel to the Y-Z plane.

Further, in each of the above described various preferred structures of the display apparatus of the present disclosure, the end portion of the light guide panel on the side of the first deflecting unit has preferably been subjected to quenching. With this, even if stray light is generated, adverse influence of the stray light can be prevented as much as possible. The quenching can be performed by forming a light absorbing layer that absorbs light (specifically, by forming a light absorbing layer made of a known light absorbing material on the outer surface of the end portion of the light guide panel on the side of the first deflecting unit), or by roughening the outer surface of the end portion of the light guide panel on the side of the first deflecting unit. The light absorbing layer can be formed with a light absorbing material such as carbon, a thin metal film, an organic resin, or glass paste, and specific examples of such materials include photosensitive polyimide resin, chromium oxide, and a film stack of chromium oxide and chromium.

Further, in the display apparatus of the present disclosure having the above described preferred configuration and structure, the image forming device may include pixels arranged in a two-dimensional matrix. An image forming device having such a structure will be hereinafter referred to as an "image forming device with the first structure", for ease of explanation.

The image forming device with the first structure may be an image forming device formed with light emitting elements such as organic EL (Electro Luminescence) elements, inorganic EL elements, or light emitting diodes (LEDs), an image forming device formed with a reflective spatial light modulating device and a light source, or an image forming device formed with a transmissive spatial light modulating device and a light source, for example. Particularly, so as to reduce the thickness of the image display unit, the image forming device is preferably formed with an organic electroluminescence display device that includes arranged organic EL elements, or a light-emitting display device that includes arranged LEDs. The spatial light modulating device may be a light valve, a transmissive or reflective liquid crystal display device such as LCOS (Liquid Crystal On Silicon), or a digital micromirror device (DMD), for example. The light source may be light emitting elements, for example. Further, the reflective spatial light modulating device may include a liquid crystal display device and a polarizing beam splitter that reflects and guides part of light from the light source toward the liquid crystal display device, and passes and guides part of light reflected by the liquid crystal display device toward the optical device. The light emitting elements forming the light source may be a red light emitting element, a green light emitting element, a blue light emitting element, and a white light emitting element. Alternatively, red light, green light, and blue light that are emitted from a red light emitting element, a green light emitting element, and a blue light emitting element may be mixed and be subjected to luminance homogenization with the use of a light pipe, to obtain white light. The light emitting elements may be semiconductor laser elements, solid-state lasers, or LEDs, for example. The number of pixels may be determined based on the specifications required for the image forming device, and specific example numbers are 320×240, 432×240, 640×480, 1024×768, and 1920×1080.

Alternatively, in the display apparatus of the present disclosure having the above described preferred configuration and structure, the image forming device may include a light source and a scanning unit that scans light emitted from the light source. An image forming device having such a structure will be hereinafter referred to as an "image forming device with the second structure", for ease of explanation.

The light source in the image forming device with the second structure may be light emitting elements, and may specifically be a red light emitting element, a green light emitting element, a blue light emitting element, and a white light emitting element. Alternatively, red light, green light, and blue light that are emitted from a red light emitting element, a green light emitting element, and a blue light emitting element may be mixed and be subjected to luminance homogenization with the use of a light pipe, to obtain white light. The light emitting elements may be semiconductor laser elements, solid-state lasers, or LEDs, for example. The number of pixels (virtual pixels) in the image forming device with the second structure may also be determined based on the specifications required for the image display device, and specific example numbers are 320×240, 432×240, 640×480, 1024×768, and 1920×1080. In a case where color image display is to be performed, and the light source is formed with a red light emitting element, a green light emitting element, and a blue light emitting element, it is preferable to use a cross prism to combine colors, for example. The scanning unit horizontally and vertically scans light emitted from the light source, and may be a MEMS (Micro Electro Mechanical System) having a micromirror that can rotate two-dimensionally, or a galvanometer mirror, for example.

In the display apparatus of the present disclosure, light that has passed through an optical system (specifically, a collimator optical system or a relay optical system) preferably enters the light guide panel. The optical system may be an optical system that is formed with a convex lens, a concave lens, an adjustable-surface prism, a hologram lens, or a combination of them, and generally has positive optical power. Between the optical system and the light guide panel, a light blocking unit having an opening may be provided so that undesired light will not be emitted from the optical system to enter the light guide panel.

Light that has entered the light reflecting member is gathered as parallel light beams when emitted from the light reflecting member, and then enters the light guide panel. Light is converted into parallel light beams, because the information about the optical wavefront at the time when those light beams enter the light guide panel needs to be stored after the light beams are emitted from the light guide panel via the first deflecting unit and the second deflecting unit. The adjustable surfaces of the light reflecting member should be designed so that light that has entered the light reflecting member can be gathered as parallel light beams when emitted from the light reflecting member.

In the display apparatus of the present disclosure that can have the above described various preferred configurations and structures, the optical device is of a semi-transmissive type (a see-through type). Specifically, portions of the optical device facing at least an eye of the viewer are semi-transmissive (see-through), and it is possible to see the outside through these portions of the optical device. The display apparatus may include one image display device, or may include two image display devices.

Here, the first deflecting unit may be designed to reflect part of light reflecting member colliding light, and the second deflecting unit may be designed to pass or reflect, more than once, the light that has propagated inside the light guide panel by total reflection. In this case, the first deflecting unit and the second deflecting unit may be designed to function as semi-transmissive mirrors. Specifically, the first deflecting unit and the second deflecting unit may be formed with multi-layer stack structures formed by stacking a large number of dielectric laminated films, half mirrors, polarizing beam splitters, or diffraction gratings (such as hologram diffraction grating films). The first deflecting unit and the second deflecting unit are located inside the light guide panel (or are incorporated into the light guide panel). In the first deflecting unit, part of light reflecting member colliding light is reflected or diffracted so that the part of the light reflecting member colliding light is totally reflected inside the light guide panel. In the second deflecting unit, on the other hand, parallel light beams having propagated inside the light guide panel by total reflection are reflected or diffracted more than once, and are emitted as parallel light beams from the light guide panel.

Alternatively, the first deflecting unit may be designed to diffract light reflecting member colliding light, and the second deflecting unit may be designed to diffract, more than once, light having propagated inside the light guide panel by total reflection. In this case, the first deflecting unit and the second deflecting unit may be formed with diffraction grating elements. Further, the diffraction grating elements may be formed with reflective diffraction grating elements or transmissive diffraction grating elements. Alternatively, one of the diffraction grating elements may be formed with a reflective diffraction grating element while the other one of the diffraction grating elements is formed with a transmissive diffraction grating element. The reflective diffraction grating elements may be reflective volume hologram diffraction gratings. The first deflecting unit formed with a reflective volume hologram diffraction grating will be hereinafter also referred to as "the first diffraction grating member", for ease of explanation, and the second deflecting unit formed with a reflective volume hologram diffraction grating will be hereinafter also referred to as "the second diffraction grating member", for ease of explanation.

With the image display device of the present disclosure, images in a single color (green, for example) can be displayed. In a case where color images are to be displayed, the first diffraction grating member or the second diffraction grating member may be formed by stacking P diffraction grating layers that are reflective volume hologram diffraction gratings, so as to cope with diffraction and reflection of P types (P=3: the three colors of red, green, and blue, for example) of light having P different wavelength bands (or wavelengths). Interference fringes compatible with one wavelength band (or one wavelength) are formed in each diffraction grating layer. Alternatively, so as to cope with diffraction and reflection of P types of light having P different wavelength bands (or wavelengths), P types of interference fringes may be formed in the first diffraction grating member or the second diffraction grating member formed with a single diffraction grating layer. In some other case, the angle of view may be equally divided into three, and the first diffraction grating member or the second diffraction grating member may be formed by stacking diffraction grating layers corresponding to the respective divided angles of view. Alternatively, a first diffraction grating member and a second diffraction grating member that are diffraction grating layers formed with reflective volume hologram diffraction gratings that diffract and reflect light having the wavelength band (or the wavelength) of red may be provided in a first light guide panel, a first diffraction grating member and a second diffraction grating member that are diffraction grating layers formed with reflective volume hologram diffraction gratings that diffract and reflect light having the wavelength band (or the wavelength) of green may be provided in a second light guide panel, a first diffraction grating member and a second diffraction grating member that are diffraction grating layers formed with reflective volume hologram diffraction gratings that diffract and reflect light having the wavelength band (or the wavelength) of blue may be provided in a third light guide panel, and the first light guide panel, the second light guide panel, and the third light guide panel may be stacked, with some spaces being left between these light guide panels. With those structures, the diffraction efficiency can be increased, the diffraction acceptance angle can be made larger, and the diffraction angle can be optimized, when light of each wavelength band (or wavelength) is diffracted and reflected by the first diffraction grating member or the second diffraction grating member. It is preferable to provide protecting members so that the reflective volume hologram diffraction gratings are not in direct contact with the atmosphere.

The first diffraction grating member and the second diffraction grating member may be made of photopolymer materials, for example. The constituent materials and the fundamental structures of the first diffraction grating member and the second diffraction grating member formed with reflective volume hologram diffraction gratings may be the same as the constituent materials and the structures of conventional reflective volume hologram diffraction gratings. A reflective volume hologram diffraction grating is a hologram diffraction grating that diffracts and reflects only positive first-order diffracted light. Interference fringes are formed in the inside and on the surfaces of the diffraction grating members. The interference fringes may be formed by the same method as a conventional formation method. Specifically, object light is emitted from a first predetermined direction on one side of the material (a photopolymer material, for example) of a diffraction grating member, and at the same time, reference light is emitted from a second predetermined direction on the other side of the material of the diffraction grating member. The interference fringes formed by the object light and the reference light should be recorded inside the material of the diffraction grating member. The first predetermined direction, the second predetermined direction, and the wavelengths of the object light and the reference light are appropriately selected, so that a desired pitch of interference fringes and a desired tilt angle (slant angle) of interference fringes on the surface of the diffraction grating member can be obtained. The tilt angle of interference fringes is the angle between the surface of a diffraction grating member (or a diffraction grating layer) and the interference fringes. In a case where the first diffraction grating member and the second diffraction grating member are formed with stack structures each including P diffraction grating layers formed with reflective volume hologram diffraction gratings, the P diffraction grating layers may be stacked (bonded) with the use of an ultraviolet cure adhesive after the P diffraction grating layers are manufactured separately from one another. The P diffraction grating layers may be manufactured as follows: one diffraction grating layer is formed with an adhesive photopolymer material, and adhesive photopolymer materials are bonded onto the diffraction grating layer one by one, to form diffraction grating layers.

Also, in the image display device of the present disclosure, the optical device may be formed with a pair of semi-transmissive mirrors that receive part of light reflecting member colliding light and then emits the light toward an eye of a viewer. The part of the light reflecting member colliding light may be reflected by a first semi-transmissive mirror, travel in the air, and then enter a second semi-transmissive mirror, or may travel inside a transparent member such as a glass panel or a plastic panel (specifically, a member made of the same material as the material of the later described light guide panel) and then enter the second semi-transmissive mirror. The second semi-transmissive mirror may be attached to the image forming device via the transparent member, or the second semi-transmissive mirror may be attached to the image forming device via a different member from the transparent member. The first semi-transmissive mirror, the transparent member, and the second semi-transmissive mirror may be attached to the frame with appropriate attachment units.

The light guide panel has two parallel surfaces (a first surface and a second surface) that extend parallel to the axis line (the X-axis) of the light guide panel. Where the surface of the light guide panel that first receives light is the incidence surface of the light guide panel, and the surface of the light guide panel from which light is eventually emitted is the emitting surface of the light guide panel, the first surface may serve as both the incidence surface of the light guide panel and the emitting surface of the light guide panel, or the first surface may serve as the incidence surface of the light guide panel while the second surface serves as the emitting surface of the light guide panel. The light guide panel may be made of glass containing optical glass such as silica glass or BK7, or a plastic material (such as PMMA, polycarbonate resin, acrylic resin, non-crystalline polypropylene resin, or styrene resin including AS resin). The light guide panel is not necessarily flat, but may have a curved shape.

In the display apparatus of the present disclosure that can have the above described various preferred configurations and structures, the frame is formed with a front unit that is located in front of the viewer, and two temple units rotatably attached to both ends of the front unit via hinges. End covers are attached to the tips of the respective temple units. The image display device is attached to the frame, and specifically, the image forming device may be attached to the temple units, for example. The front unit and the two temple units may be integrally formed. When the entire display apparatus of the present disclosure is viewed, the frame has substantially the same structure as a regular pair of eyeglasses. The material forming the fame may be made of the same material as a material of regular eyeglasses, such as a metal, an alloy, plastic, or a combination of these materials Nose pads may be further attached to the front unit. When the entire display apparatus of the present disclosure is viewed, the assembly of the frame and the nose pads has substantially the same structure as a regular pair of eyeglasses, except that no rims are included. The nose pads may also have a conventional configuration and structure.

So as to improve the design of the display apparatus or facilitate use of the display apparatus of the present disclosure that can have the above described various preferred configurations and structures, wires (such as signal wires and power wires) extending from one or two image forming devices preferably further extend from the ends of the end covers via the insides of the temple units and the end covers, and are preferably connected to a control device (a control circuit or a control unit). Each image forming device further includes a headphone unit, and headphone wires extending from the image forming device may preferably further extend from the edges of the end covers to the headphone unit via the insides of the temple units and the end covers. The headphone unit may be an in-ear monitor or a canal-phone, for example. More specifically, the headphone wires extend from the edges of the end covers to the headphone unit, each wrapping around the back of the auricle (the ear capsule). Further, an imaging device may be attached to a middle portion of the front unit. Specifically, the imaging device is formed with a solid-state imaging element such as a CCD or a CMOS sensor, and a lens, for example. The wires extending from the imaging device may be connected to one of the image display devices (or the image forming devices) via the front unit, for example, or further, may be included in the wires extending from the image display devices (or the image forming devices).

In the display apparatus of the present disclosure that can have the above described various preferred configurations and structures, a dimmer that adjusts the amount of external light entering from outside may be placed in the region of the optical device (the light guide panel) facing at least an eye of the viewer. As the dimmer is provided, a problem of insufficient contrast in an image to be viewed by the viewer can be prevented. Such a problem is caused when the surroundings of the image display device are extremely bright, or is caused depending on the contents of the displayed image.

Here, the dimmer may include:
a first substrate that faces the optical device, and a second substrate located on the opposite side from the first substrate;
electrodes formed on the first substrate and the second substrate, respectively; and
a light transmission control material layer sealed between the first substrate and the second substrate. The first substrate preferably serves as a member (specifically, the light guide panel) of the optical device. Alternatively, the second substrate is preferably thinner than the first substrate. Where the first substrate of the dimmer also serves as a member of the optical device, or the second substrate is thinner than the first substrate, the weight of the entire display apparatus can be reduced, and the user (viewer) of the display apparatus will not feel discomfort.

The dimmer may be an optical shutter that has a light transmission control material layer formed with a liquid crystal material layer, or the dimmer may be an optical shutter that has a light transmission control material layer formed with an inorganic electroluminescence material layer. However, the dimmer is not limited to them, and may be an optical shutter formed with an electrophoretic dispersion liquid formed with a large number of charged electrophoretic particles and a dispersion medium of a different color from the electrophoretic particles, an optical shutter based on an electrodeposition technique (electrodeposition or field deposition) using an electrodeposition/dissociation phenomenon caused by a reversible oxidation-reduction reaction of a metal (silver particles, for example), an optical shutter that uses a change in the color of a substance caused by an oxidation-reduction reaction of an electrochromic material, or an optical shutter that controls light transmittance through an electrowetting phenomenon.

In a case where the dimmer is an optical shutter that has a light transmission control material layer formed with a liquid crystal material layer, the material forming the light transmission control material layer is not particularly limited, but may be a TN (twisted nematic) liquid crystal material or a STN (super-twisted nematic) liquid crystal material, for example. In a case where the dimmer is an optical shutter that has a light transmission control material layer formed with an inorganic electroluminescence material layer, the material forming the light transmission control material layer is not particularly limited, but may be tungsten oxide ($WO_3$), for example.

Although the optical device and the dimmer are preferably located in this order from the viewer side, but the dimmer and the optical device may be located in this order.

The materials forming the first substrate and the second substrate in the dimmer may be transparent glass substrates made of soda-lime glass or white sheet glass, plastic substrates, plastic sheets, or plastic films, for example. Here, examples of plastic materials include polyethylene terephthalate, polyethylene naphthalate, polycarbonate, cellulose esters such as cellulose acetate, fluoropolymers such as a copolymer of polyvinylidene fluoride or polytetrafluoroethylene and hexafluoropropylene, polyethers such as polyoxymethylene, polyacetal, polystyrene, polyethylene, polypropylene, polyolefins such as a methylpentene polymer, polyimides such as polyamide-imide and polyetherimide, polyamide, polyethersulfone, polyphenylene sulfide, polyvinylidene fluoride, tetraacetyl cellulose, brominated phenoxy, polyarylate, polysulfone, and the like. The plastic sheets and the plastic films may have such rigidity that the sheets and the films are not easily bent, or may have flexibility. In a case where the first substrate and the second substrate are formed with transparent plastic substrates, barrier layers made of an inorganic material or an organic material may be formed on the inner surfaces of the substrates.

The first electrode and the second electrode may be so-called transparent electrodes, and specifically be electrodes made of indium-tin oxide (ITO, Indium Tin Oxide, Sn-doped $In_2O_3$, crystalline ITO, or amorphous ITO), fluorine-doped $SnO_2$ (FTC)), IFO (F-doped $In_2O_3$), antimony-doped $SnO_2$ (ATO), $SnO_2$, ZnO (Al-doped ZnO or B-doped ZnO), indium-zinc oxide (IZO, Indium Zinc Oxide), spinel oxide, an oxide having a $YbFe_2O_4$ structure, a conductive copolymer such as polyaniline, polypyrrole, or polythiophene, or the like. However, the first electrode and the second electrode are not limited to the above materials, and a combination of two or more of these materials may be used. The first electrode and the second electrode can be formed by a physical vapor deposition method (PVD method) such as a vacuum deposition method or a sputtering technique, a chemical vapor deposition method (CVD method), a coating method, or the like. Electrode patterning is normally unnecessary. However, in a case where patterning is performed as desired, the patterning can be performed by any method such as an etching technique, a lift-off technique, a technique using a mask.

The first substrate and the second substrate are sealed and bonded to outer edges with a sealing agent. The sealing agent that is also called a sealant may be a resin of a thermosetting type, a photosetting type, a moisture-curing type, an anaerobic-curing type, or the like, such as epoxy resin, urethane resin, acrylic resin, vinyl acetate resin, enethiol resin, silicone resin, or a modified polymer resin.

The display apparatus may further include an illuminance sensor (also referred to as the "environmental illuminance measuring sensor", for ease of explanation) that measures illuminance of the environment in which the display apparatus is placed. Based on a result of measurement carried out by the illuminance sensor (environmental illuminance measuring sensor), light transmittance of the dimmer is controlled, or luminance of an image to be formed by the image forming device is controlled.

The display apparatus may further include a second illuminance sensor (also referred to as the "transmitted-light illuminance measuring sensor", for ease of explanation) that measures illuminance based on light transmitted from the external environment through the dimmer. Based on a result of measurement carried out by the second illuminance sensor (transmitted-light illuminance measuring sensor), light transmittance of the dimmer is controlled, and/or luminance of an image to be formed by the image forming device is controlled.

As described above, the transmittance of the dimmer is controlled based on a result of measurement carried out by the illuminance sensor (environmental illuminance measuring sensor), the luminance of an image to be formed by the image forming device is controlled based on a result of measurement carried out by the illuminance sensor (environmental illuminance measuring sensors), the transmittance of the dimmer is controlled based on a result of measurement carried out by the second illuminance sensor (transmitted-light illuminance measuring sensor), and the luminance of an image to be formed by the image forming device is controlled based on a result of measurement carried out by second illuminance sensor (transmitted-light illuminance measuring sensor). In this manner, images to be viewed by the viewer can have high contrast, and the image viewing condition can be optimized depending on the illuminance of the environment in which the display apparatus is placed. The illuminance sensor (the environmental illuminance measuring sensor or the transmitted-light illuminance measuring sensor) may be formed with a known illuminance sensor, and may be controlled based on a known control circuit.

In the display apparatus of the present disclosure including the second illuminance sensor (transmitted-light illuminance measuring sensor), the second illuminance sensor (transmitted-light illuminance measuring sensor) is preferably placed on the viewer side of the optical device.

The highest light transmittance of the dimmer may be 50%, and the lowest light transmittance of the dimmer may be 30% or lower. The lower limit of the lowest light transmittance of the dimmer may be 1%, for example.

When the result of measurement carried out by the illuminance sensor (environmental illuminance measuring sensor) is equal to or greater than a predetermined value (also referred to as the "first illuminance measurement value", for ease of explanation), the light transmittance of the dimmer may be adjusted to a predetermined value (also referred to as the "first light transmittance", for ease of explanation) or lower. When the result of measurement carried out by the illuminance sensor (environmental illuminance measuring sensor) is equal to or smaller than a predetermined value (also referred to as the "second illuminance measurement value", for ease of explanation), the light transmittance of the dimmer may be adjusted to a predetermined value (also referred to as the "second light transmittance", for ease of explanation) or higher. Further, in a case where a result of measurement carried out by the transmitted-light illuminance measuring sensor is not a desired illuminance in view of the illuminance from the environmental illuminance measuring sensor, or in a case where even finer illuminance adjustment is desired, the light transmittance of the dimmer should be adjusted while the value at the second illuminance sensor (transmitted-light illuminance measuring sensor) is monitored. Here, the first illuminance measurement value may be 10 lux, the first light transmittance may be any value between 1% and 30%, the second illuminance measurement value may be 0.01 lux, and the second light transmittance may be any value between 51% and 99%. In a case where the luminance measurement value of the environmental illuminance measuring sensor is $1 \times 10^{-3}$ lux or smaller, the drive voltage of the dimmer is preferably controlled, for example, to shorten the drive time and increase the light transmittance of the dimmer as quickly as possible.

In some cases, the dimmer may be designed to give a desired color to light that passes through the dimmer. In such cases, the color to be given by the dimmer may be variable, or the color to be given by the dimmer may be fixed. In the former case, a dimmer to give the red color, a dimmer to give the green color, and a dimmer to give the blue color may be stacked, for example. In the latter case, the color to be given by the dimmer is not particularly limited, but may be brown, for example.

Further, in some cases, the dimmer may be detachably set. So as to detachably set the dimmer, the dimmer may be attached to the frame with screws made of a transparent plastic material. Alternatively, a groove may be formed in the frame, and the dimmer may be engaged with the groove. Also, a magnet may be attached to the frame so that the dimmer can be attached to the frame. Further, a slide portion may be formed in the frame, and the dimmer may be engaged with the slide portion. Also, a connector may be attached to the dimmer, and the dimmer may be electrically connected to a control circuit (included in a control device for controlling the image forming device, for example) for controlling light transmittance of the dimmer via this connector and a wire.

The first deflecting unit and the second deflecting unit may be covered with one (the first substrate) of the substrates forming the dimmer. Alternatively, the second deflecting unit may be located in a projection image of the dimmer, or the dimmer may be located in a projection image of the second deflecting unit.

In the display apparatus of the present disclosure that can have the above described various preferred configurations, a light blocking member that blocks external light from entering the optical device may be placed on the opposite side of the optical device (or the light guide panel) from the viewer. Alternatively, a light blocking member that blocks external light from entering the optical device may be placed in the region of the optical device to which light is emitted from the image forming device. With this arrangement, the possibility of image display quality degradation due to external light incidence is eliminated. Specifically, the region of the optical device to which light is emitted from the image forming device is preferably included in an image of the light blocking member projected onto the optical device. Alternatively, an image of an end portion of the dimmer projected onto the optical device is preferably included in an image of the light blocking member projected onto the optical device. Alternatively, the light blocking member may be placed on the opposite side of the optical device from the viewer, and be located at a distance from the optical device. Also, the light blocking member may be placed at a portion of the optical device, the portion being located on the opposite side of the optical device from the viewer.

In the display apparatus with the above described first structure, the image forming device preferably also functions as the light blocking member. In the display apparatus with the above described second structure, the light reflecting member preferably also functions as the light blocking member. In the display apparatus with the first structure, the region of the optical device to which light is emitted from the image forming device is preferably included in an image of the image forming device projected onto the optical device. In the display apparatus with the second structure, the region of the optical device to which light is emitted from the image forming device is preferably included in an image of the light reflecting member projected onto the optical device.

The light blocking member may be made of a non-transparent plastic material, for example, and such a light blocking member may extend integrally from the housing of the image display device, or may be attached to the housing of the image display device or the like, or may extend integrally from the frame, or may be attached to the frame. Alternatively, the light blocking member may be attached to the optical device, or may be attached to the dimmer. In such a structure, the light blocking member made of a non-transparent material may be formed on the surface of the optical device by a physical vapor deposition method (PVD method) or a chemical vapor deposition method (CVD method), or may be formed by printing or the like, or may be formed by attaching a film, a sheet, or foil made of a non-transparent material (such as a plastic material, a metal material, or an alloy material) onto the surface of the optical device, for example.

EXAMPLE 1

Figure 2:
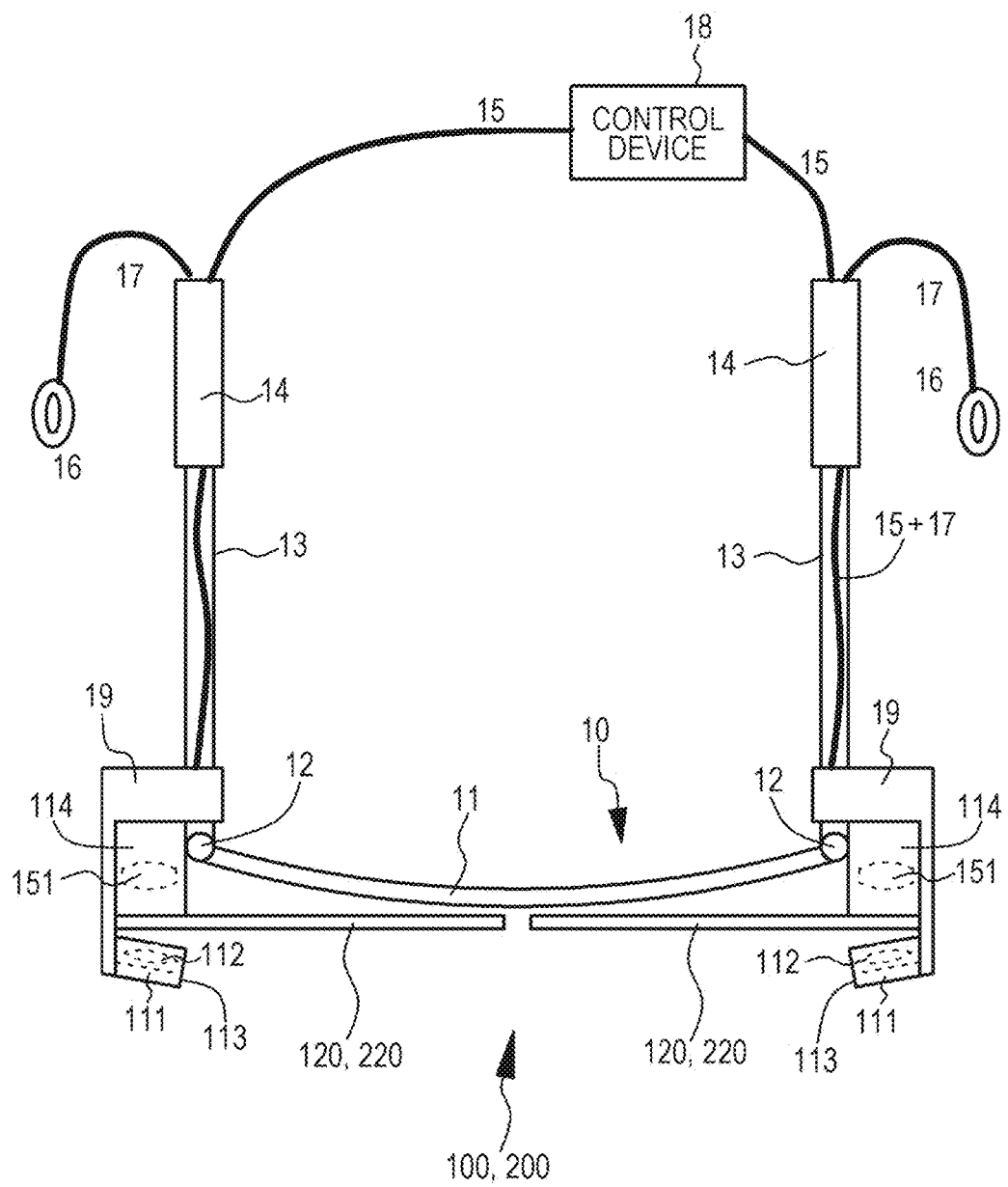
FIG. 2 is a schematic top view of the display apparatus of Example 1.
Figure 3:
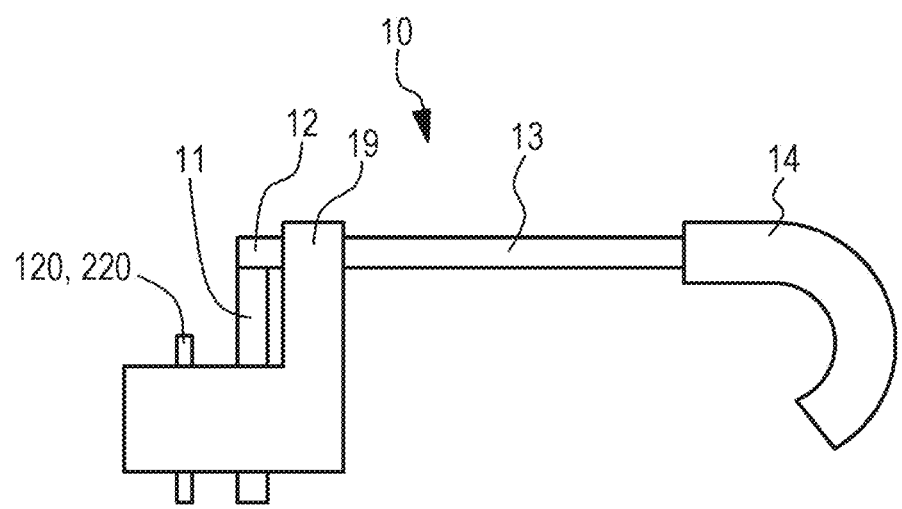
FIG. 3 is a schematic side view of the display apparatus of Example 1.

Example 1 relates to a display apparatus according to a first embodiment of the present disclosure, and more particularly, to a display apparatus with the first structure. FIG. 1 is a conceptual diagram of an image display device of Example 1. FIG. 2 is a schematic top view of a display apparatus of Example 1 (specifically, a head mounted display (HMD)). FIG. 3 is a schematic side view of the display apparatus.

A display apparatus of Example 1 or Examples 2 through 8 described later includes:

(a) a frame (specifically, an eyeglass-type frame) 10 to be mounted on the head of a viewer, and (b) image display devices 100, 200, 300, or 500 attached to the frame 10. A display apparatus of Example 1 or Examples 2 through 8 described later is a binocular type display apparatus including two image display devices, but may be a monocular type display apparatus including one image display device. Meanwhile, image forming devices 111 and 511 display color images, for example.

An image display device 100, 200, 300, or 500 of Example 1 or Examples 2 through 8 described layer includes:

(A) an image forming device 111 or 511; and (B) an optical device (a light guiding units) 120, 220, or 320 that guides images from the image forming device 111 or 511 to an eye 21 or a viewer. The optical device 120, 220, or 320 are of a see-through type (a semi-transmissive type). The image display device 100, 200, 300, or 500 further includes (C) an optical system 112 or 525 that collimates light emitted from the image forming device 111 or 511, wherein a flux of light that has passed through the optical system 112 or 525 enters the optical device 120, 220, or 320.

Here, the optical device 120, 220, or 320 (the light guiding units) in Example 1 or Examples 2 through 8 described layer includes a first deflecting unit 130 or 230 that deflects an image from the image forming device 111 or 511; and a second deflecting unit 140, 240, or 340 that deflects the image deflected by the first deflecting unit 130 or 230 toward the eye of the viewer. The image display device 100, 200, 300, or 500 further includes a light reflecting member 151 placed so as to sandwich the optical device 120, 220, or 320 with the image forming device 111 or 511, and face the image forming device 111 or 511. Light that has been emitted from the image forming device 111 or 511 passes through the optical device 120, 220, or 320, reflected by the light reflecting member 151, reenters the optical device 120, 220, or 320, and is deflected by the first deflecting unit 130 or 230. The image forming device 111 or 511 and the optical system 112 are housed in a housing 113. The light reflecting member 151 is also reflected in a housing 114.

More specifically, in the display apparatus of Example 1, each optical device 120 includes:

(B-1) the light guide panel 121 that causes incident light to propagate therein by total reflection, and then emits the light;

(B-2) the first deflecting unit 130; and (B-3) the second deflecting unit 140 that deflects, more than once, the light that has propagated inside the light guide panel 121 by total reflection, so that the light is emitted from the light guide panel 121. The image display device 151 is placed so as to face the image forming device 111, with the light guide panel 121 being interposed in between. Light that has been emitted from the image forming device 111 passes through the light guide panel 121, reflected by the light reflecting member 151, reenters the light guide panel 121, and is deflected by the first deflecting unit 130 so as to be totally reflected inside the light guide panel 121.

The light reflecting member 151 is formed with an optical member including a first surface 152A into and from which light from the image forming device 111 is guided and emitted, and a second surface 152B that is located on the opposite side from the first surface 152A. A light reflecting layer 153 formed with a thin silver film is formed on the second surface 152B. The first surface 152A and the second surface 152B are formed with adjustable surfaces. More specifically, the external shape of the optical member 152 forming the light reflecting member 151 is a thick lens-like shape. That is, the optical member 152 is formed with the first surface 152A, the second surface 152B, and a side surface 152C. The adjustable surfaces are asymmetrical in the x-z plane, and are symmetrical in the y-z plane. The display apparatus of Example 1 is a display apparatus with the first structure, and the light reflecting member 151 is placed on the viewer side of the light guide panel 121.

The image forming device 111 is formed with an image forming device with the first structure that includes pixels arranged in a two-dimensional matrix, and more specifically, is formed with an organic electroluminescence display device having organic EL elements arranged in a two-dimensional matrix. The image forming device 111 is placed in a nonparallel manner with respect to the light guide panel 121. Furthermore, the end portion 121A of the light guide panel 121 on the side of the first deflecting unit 130 is subjected to quenching. Specifically, a light absorbing layer 126 made of a known light absorbing material is formed on the outer surface of the end portion 121A (the end surface, in the example shown in the drawing) of the light guide panel 121 on the side of the first deflecting unit 130. Alternatively, the light absorbing layer 126 may be formed to extend from the end surface to part of the first surface 122 and part of the second surface 123 of the light guide panel 121 described later.

In Example 1, the first deflecting unit 130 and the second deflecting unit 140 are placed inside the light guide panel 121. The first deflecting unit 130 reflects part of light reflecting member colliding light, and the second deflecting unit 140 transmits and reflects, more than once, the light that has propagated inside the light guide panel 121 by total reflection. That is, the first deflecting unit 130 and the second deflecting unit 140 function as semi-transmissive mirrors.

More specifically, the first deflecting unit 130 and the second deflecting unit 140 placed inside the light guide panel 121 are formed with multi-layer stack structures in which a large number of dielectric laminated films are stacked. The dielectric laminated films each include a $TiO_2$ films as the high-dielectric-constant material and a $SiO_2$ film as the low-dielectric-constant material, for example. A multi-layer stack structure formed by stacking a large number of dielectric laminated films is disclosed in JP 2005-521099 W. In the drawings, the second deflecting unit 140 is formed with six dielectric laminated films, but the number of dielectric laminated films is not limited to that. A thin piece made of the same material as the material forming the light guide panel 121 is interposed between each two adjacent dielectric laminated films. At the first deflecting unit 130, light reflecting member colliding light is reflected (or diffracted), so that part of the light reflecting member colliding light is totally reflected inside the light guide panel 121. At the second deflecting unit 140, on the other hand, parallel light beams that have propagated inside the light guide panel 121 by total reflection are reflected (or diffracted) more than once, and are emitted as parallel light beams from the light guide panel 121 toward the eye 21 of the viewer.

Figure 23:
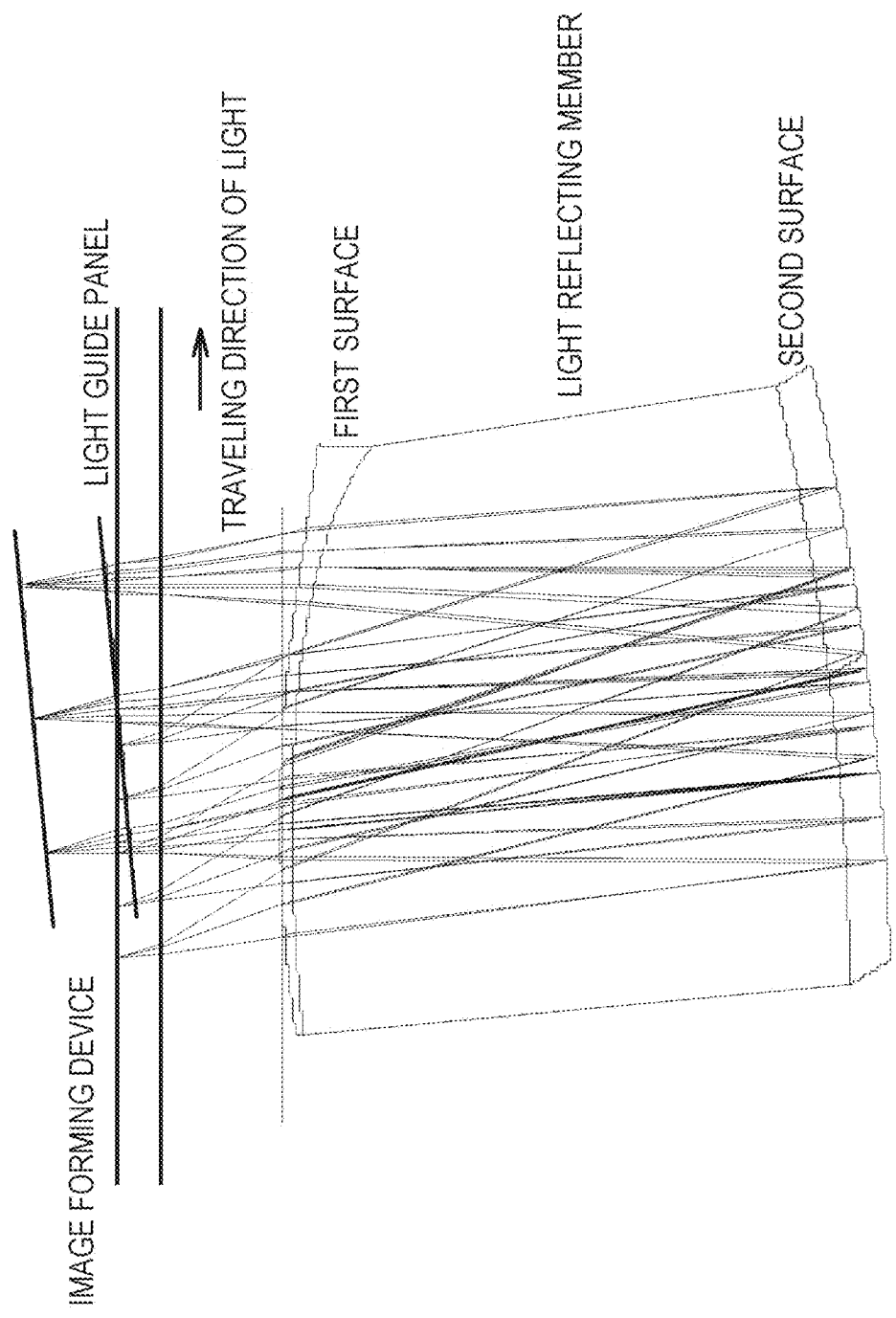
FIG. 23 is a diagram showing a simulation of a situation where light emitted from an image forming device passes through a light guide panel, is reflected by a light reflecting member, and reenters the light guide panel.
Figure 24:
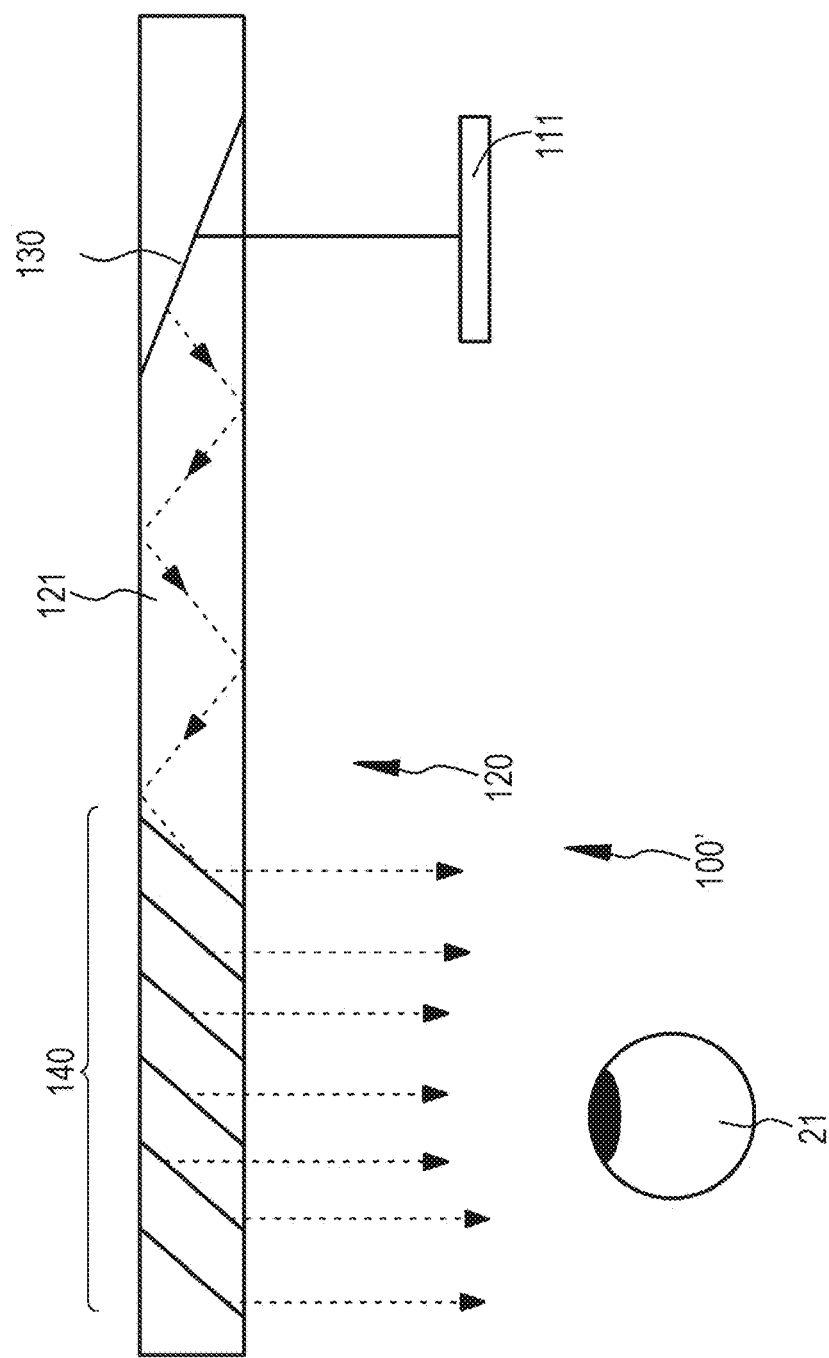
FIG. 24 is a conceptual diagram of an image display device in a conventional display apparatus.

FIG. 23 shows a result of a simulation of a situation where light emitted from the image forming device 111 passes through the light guide panel 121, is reflected by the light reflecting member 151, and reenters the light guide panel 121. More specifically, light that been emitted from the image forming device 111 and has passed through the optical system 112 enters the light guide panel 121 and collides with the first deflecting unit 130. Part of the light that has collided with the first deflecting unit 130 is reflected by the first deflecting unit 130 and is emitted from the light guide panel 121, or travels toward the end portion 121A of the light guide panel 121 on the side of the first deflecting unit 130 and is lastly absorbed by the light absorbing layer 126 or is emitted from the light guide panel 121. This light does not in any way affect image display. Meanwhile, the remaining part of the light that has collided with the first deflecting unit 130 passes through the first deflecting unit 130, is emitted from the light guide panel 121, is reflected by the light reflecting member 151, is gathered as parallel light beams at the time of the exit from the light reflecting member 151, and reenters the light guide panel 121. The parallel light beams then collide again with the first deflecting unit 130. Some of the parallel light beams (the light reflecting member colliding light) that have collided with the first deflecting unit 130 pass through the first deflecting unit 130, and are emitted from the light guide panel 121. However, this light does not in any way affect image display. Meanwhile, the remaining ones of the parallel light beams (the light reflecting member colliding light) that have collided with the first deflecting unit 130 are reflected (or diffracted) by the first deflecting unit 130, so as to be totally reflected inside the light guide panel 121. At the second deflecting unit 140, parallel light beams that have propagated inside the light guide panel 121 by total reflection are reflected (or diffracted) more than once, and are emitted as parallel light beams from the light guide panel 121 toward the eye 21 of the viewer.

As for the formation of the first deflecting unit 130, the portion 124 at which the first deflecting unit 130 is to be formed in the light guide panel 121 is cut off to create the slope on which the first deflecting unit 130 is to be formed in the light guide panel 121. After a multi-layer stack structure is formed on the slope (by a vacuum deposition method, for example), the portion 124 cut off from the light guide panel 121 is bonded to the first deflecting unit 130. As for the formation of the second deflecting unit 140, a multi-layer stack structure in which the same material as the material (such as glass) forming the light guide panel 121 and a large number of dielectric laminated films are stacked is manufactured. The portion 125 at which the second deflecting unit 140 is to be formed in the light guide panel 121 is cut off to form a slope, and the multi-layer stack structure is bonded to the slope. Polishing or the like is then performed to adjust the external shape. In this manner, the optical device 120 that has the first deflecting unit 130 and the second deflecting unit 140 formed inside the light guide panel 121 can be obtained.

In Example 1 or Example 2 and Examples 4 through 8 described later, the light guide panel 121 or 221 made of optical glass or a plastic material has two parallel surfaces (a first surface 122 or 222 and a second surface 123 or 223) that extend parallel to the direction (the X-axis) of light propagation caused in the light guide panel 121 or 221 by total reflection. The first surface 122 or 222 is located on the opposite side from the second surface 123 or 223. Parallel light beams enter the first surface 122 or 222 or the second surface 123 or 223, which is equivalent to the light incident surface, and propagate inside by total reflection. The parallel light beams are then emitted from the first surface 122 or 222, which is equivalent to the light emitting surface.

The frame 10 is formed with a front unit 11 that is located on the front side of the viewer, two temple units 13 that are rotatably attached to both ends of the front unit 11 via hinges 12, and end covers (also called tip cells, ear cushions, or ear pads) 14 attached to the end portions of the respective temple units 13. Nose pads (not shown) are also attached to the frame 10. The assembly of the frame 10 and the nose pads is basically the same structure as a conventional pair of glasses. Further, the housings 113 that house the image forming devices 111 and the optical systems 112, and the housings 114 that house the light reflecting members 151 are detachably attached to the temple units 13 with attachment members 19. The frame 10 is made of a metal or plastic. Alternatively, the housings 113 and 114 may be attached to the temple units 13 with the attachment members 19 in a non-detachable manner. For a viewer who owns and wears glasses, the housings 113 and 114 may be detachably attached to the temple units of the frames of the glasses of the viewer with the attachment members 19.

A wire (such as a signal wire or a power wires) 15 extending from one of the image forming devices 111 further extends from the edge of the end cover 14 via the insides of the temple unit 13 and the end cover 14, and is connected to a control device (a control circuit or a control unit) 18. Each of the image forming devices 111 further includes a headphone unit 16, and a headphone wire 17 extending from the image forming device 111 further extends from the edge of the end cover 14 to the headphone unit 16 via the insides of the temple unit 13 and the end cover 14. More specifically, the headphone wires 17 extend from the edges of the end covers 14 to the headphone units 16, each wrapping around the back of each corresponding auricle (ear capsule). With this structure, the headphone units 16 and the headphone wires 17 do not give the impression of being disorganized, and a neat display apparatus can be formed.

As the display apparatus of Example 1 includes the light reflecting members arranged so that the optical devices are interposed between the image forming devices and the light reflecting members, the degree of freedom in arranging the image forming devices can be increased. Specifically, the image forming devices and the optical devices are arranged in a nonparallel manner, and the light reflecting members are arranged parallel to the optical devices. With this arrangement, light that is emitted from the image forming devices and propagates inside the light guide panel toward the second deflecting units can be in an optimum reflected state (or deflected/reflected state as described later) at the first deflecting units. Also, as the image forming devices are located at distances from the head of the viewer, the viewer does not feel discomfort due to heat generated from the image forming devices.

EXAMPLE 2

Figure 4:
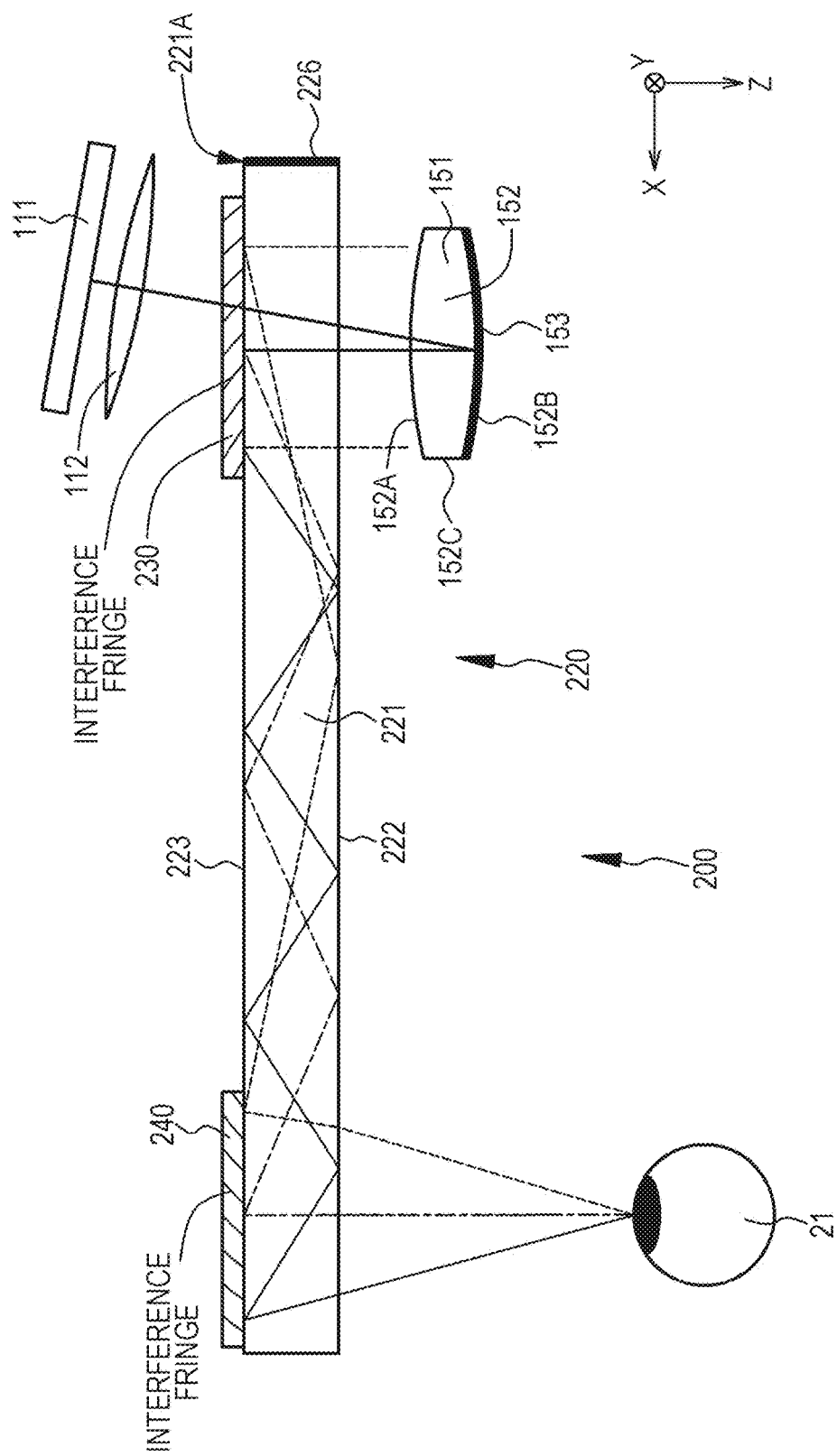
FIG. 4 is a conceptual diagram of a display apparatus of Example 2.
Figure 5:
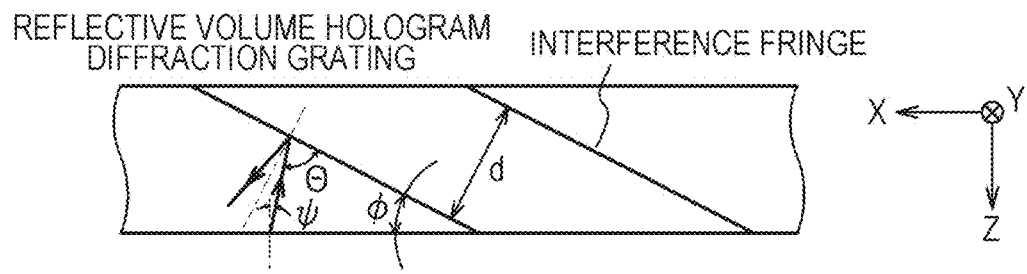
FIG. 5 is a schematic enlarged cross-sectional view of part of a reflective volume hologram diffraction grating in the display apparatus of Example 2.

Example 2 is a modification of Example 1. FIG. 4 is a conceptual diagram of the image display device 200 in a display apparatus (a head mounted display) of Example 2. FIG. 5 is a schematic enlarged cross-sectional view of part of a reflective volume hologram diffraction grating. In Example 2, the image forming device 111 is formed with an image forming device with a display apparatus with the first structure and an image forming device with the first structure, as in Example 1. The optical device 220 basically has the same configuration and structure as the optical device 120 of Example 1, except for the configurations and structures of the first deflecting unit and the second deflecting unit.

In Example 2, the first deflecting unit and the second deflecting unit are placed on the surface of the light guide panel 221 (more specifically, on the second surface 223 of the light guide panel 221). The first deflecting unit diffracts parallel light beams (light reflecting member colliding light) that have entered the light guide panel 221, and the second deflecting unit diffracts, more than once, the light that has propagated inside the light guide panel 221 by total reflection. The first deflecting unit and the second deflecting unit are formed with diffraction grating elements, or more specifically, with reflective diffraction grating elements, or even more specifically, with reflective volume hologram diffraction gratings. In the description below, the first deflecting unit formed with a reflective volume hologram diffraction grating will be referred to as "the first diffraction grating member 230", for ease of explanation, and the second deflecting unit formed with a reflective volume hologram diffraction grating will be referred to as "the second diffraction grating member 240", for ease of explanation.

In Example 2, the first diffraction grating member 230 and the second diffraction grating member 240 are formed stacking three diffraction grating layers. Interference fringes compatible with one wavelength band (or one wavelength) are formed in each diffraction grating layer of a photopolymer material by a conventional technique. The pitch of the interference fringes formed in the diffraction grating layers (diffraction optical elements) is constant, and the interference fringes are in a linear fashion and extend parallel to the Y-axis. The axis lines of the first diffraction grating member 230 and the second diffraction grating member 240 are parallel to the X-axis, and the normal lines are parallel to the Z-axis.

FIG. 5 is a schematic enlarged cross-sectional view of part of a reflective volume hologram diffraction grating. In the reflective volume hologram diffraction grating, interference fringes having a tilt angle φ are formed. Here, the tilt angle (slant angle) φ indicates the angle between a surface of the reflective volume hologram diffraction grating and the interference fringes. The interference fringes are formed to extend from the inside to the surfaces of the reflective volume hologram diffraction grating. The interference fringes satisfy a Bragg's condition. Here, the Bragg's condition is the condition that satisfies the equation (A) shown below. In the equation (A), m represents a positive integer, λ represents a wavelength, d represents the pitch in the grating plane (the intervals in a virtual plane including the interference fringes in the normal direction), and Θ represents the angle complementary with the incident angle with respect to the interference fringes. The relationships among Θ, the tilt angle φ, and the incident angle ψ in a case where light enters the diffraction grating member at the incident angle ψ are as shown in the equation (B).

$$m \cdot \lambda = 2 \cdot d \cdot \sin(\Theta) \quad (A)$$

$$\Theta = 90° - (\varphi + \psi) \quad (B)$$

The first diffraction grating member 230 is provided on (bonded onto) the second surface 223 of the light guide panel 221 as described above, and diffracts and reflects parallel light beams that have entered the light guide panel 221 so that the parallel light beams that have reentered the light guide panel 221 from the first surface 222 (the light reflecting member colliding light) are totally reflected inside the light guide panel 221. Further, the second diffraction grating member 240 is provided on (bonded onto) the second surface 223 of the light guide panel 221 as described above, and diffracts and reflects, more than once, the parallel light beams that have propagated inside the light guide panel 221 by total reflection. The parallel light beams are then emitted as parallel light beams from the first surface 222 of the light guide panel 221.

More specifically, light that been emitted from the image forming device 111 and has passed through the optical system 112 collides with the first diffraction grating member 230. Part of the light that has collided with the first diffraction grating member 230 is reflected by the first diffraction grating member 230, or travels toward the end portion 221A of the light guide panel 221 on the side of the first diffraction grating member 230 and is lastly absorbed by the light absorbing layer 226 or is emitted from the light guide panel 221. This light does not in any way affect image display. Meanwhile, the remaining part of the light that has collided with the first diffraction grating member 230 passes through the first diffraction grating member 230, is emitted from the light guide panel 221, is reflected by the light reflecting member 151, is gathered as parallel light beams at the time of the exit from the light reflecting member 151, and reenters the light guide panel 221. The parallel light beams then collide again with the first diffraction grating member 230. Some of the parallel light beams (the light reflecting member colliding light) that have collided with the first diffraction grating member 230 pass through the first diffraction grating member 230, and are emitted from the light guide panel 221. However, this light does not in any way affect image display. Meanwhile, the remaining ones of the parallel light beams (the light reflecting member colliding light) that have collided with the first diffraction grating member 230 are reflected and diffracted by the first diffraction grating member 230, so as to be totally reflected inside the light guide panel 221. At the second deflecting unit 240, parallel light beams that have propagated inside the light guide panel 221 by total reflection are reflected and diffracted, and are emitted as parallel light beams from the light guide panel 221 toward the eye 21 of the viewer.

Since the light guide panel 221 is thin, and the light paths in which light travels inside the light guide panel 221 are long, the number of times total reflection occurs before light reaches the second diffraction grating member 240 vary with respective angles of view. More specifically, of the parallel light beams that enter the light guide panel 221, a parallel light beam that enters at an angle of a direction toward the second diffraction grating member 240 is reflected fewer times than a parallel light beam that enters the light guide panel 221 at an angle of a direction away from the second diffraction grating member 240. This is because a parallel light beam that is diffracted and reflected by the first diffraction grating member 230 and enters the light guide panel 221 at an angle of a direction toward the second diffraction grating member 240 is at a smaller angle with respect to the normal line of the light guide panel 221 at the time of a collision of light traveling in the light guide panel 221 with an internal surface of the light guide panel 221, compared with a parallel light beam that enters the light guide panel 221 at an angle of the opposite direction. The shapes of the interference fringes formed inside the second diffraction grating member 240 and the shapes of the interference fringes formed inside the first diffraction grating member 230 are symmetrical about a virtual plane perpendicular to the axis line of the light guide panel 221. The surfaces of the first diffraction grating member 230 and the second diffraction grating member 240 not facing the light guide panel 221 are covered with protecting members (protecting panels) (not shown) to prevent damage to the first diffraction grating member 230 and the second diffraction grating member 240. The protecting members are bonded to the light guide panel 221 with an adhesive agent (not shown) at outer peripheral portions. Also, a transparent protective film may be attached to the first surface 222, to protect the light guide panel 221.

Figure 6:
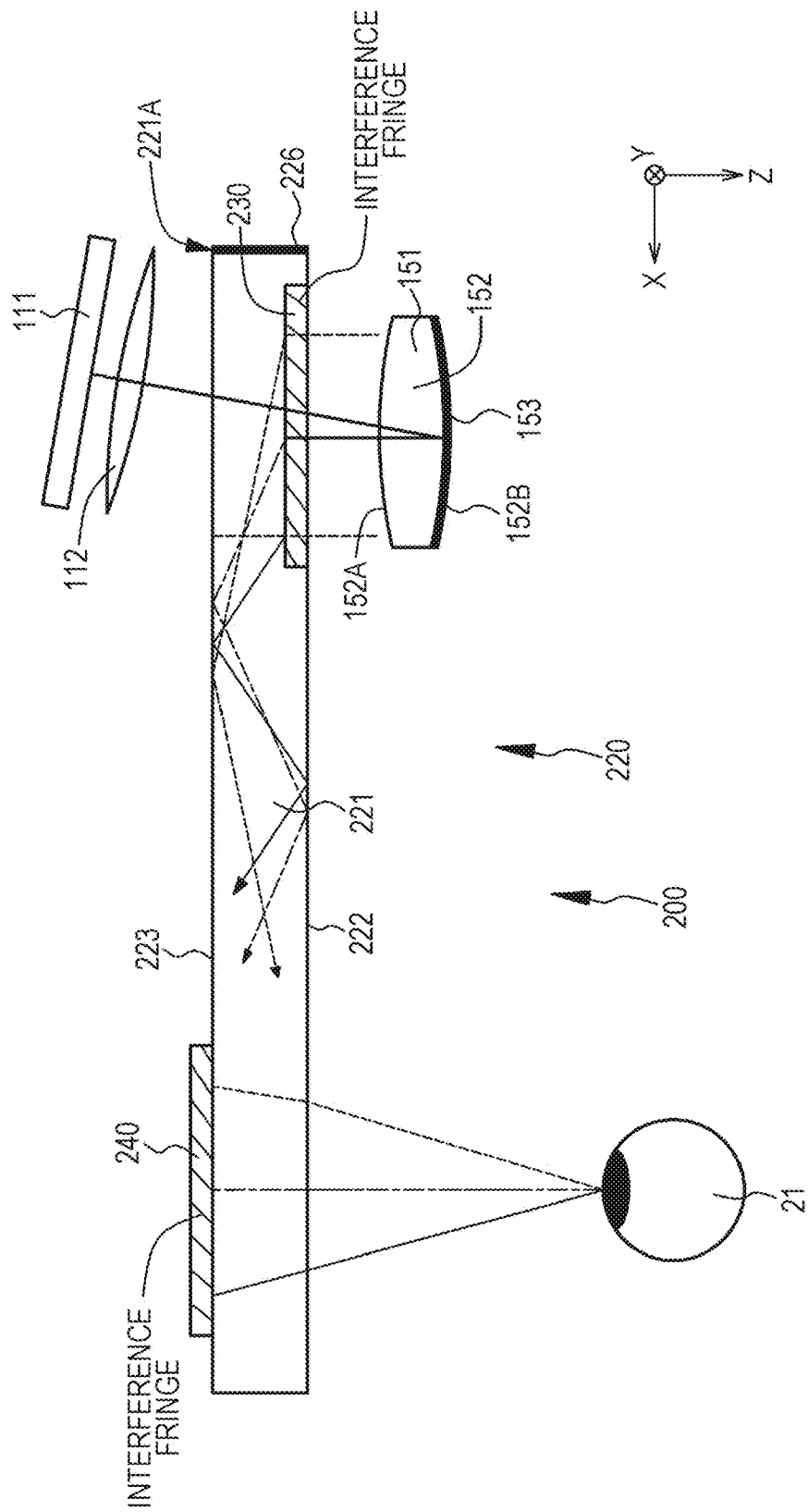
FIG. 6 is a conceptual diagram of a modification of the display apparatus of Example 2.

FIG. 6 shows a modification of an optical device in the display apparatus of Example 2. In the example shown in FIG. 6, the first diffraction grating member 230 is formed with a transmissive diffraction grating element, and is placed on (bonded onto) the first surface 222 of the light guide panel 221.

EXAMPLE 3

Figure 7:
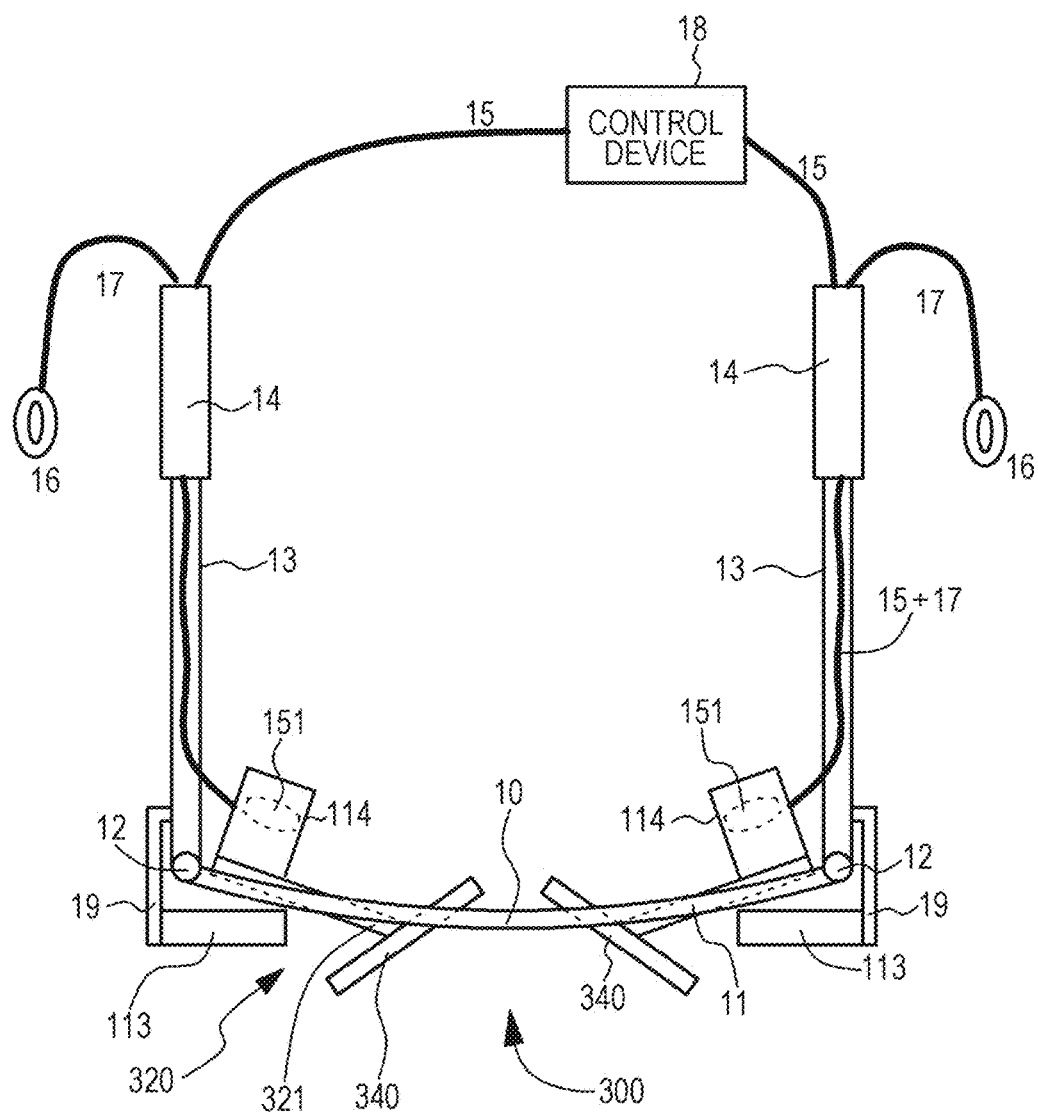
FIG. 7 is a schematic top view of the display apparatus of Example 3.
Figure 8:
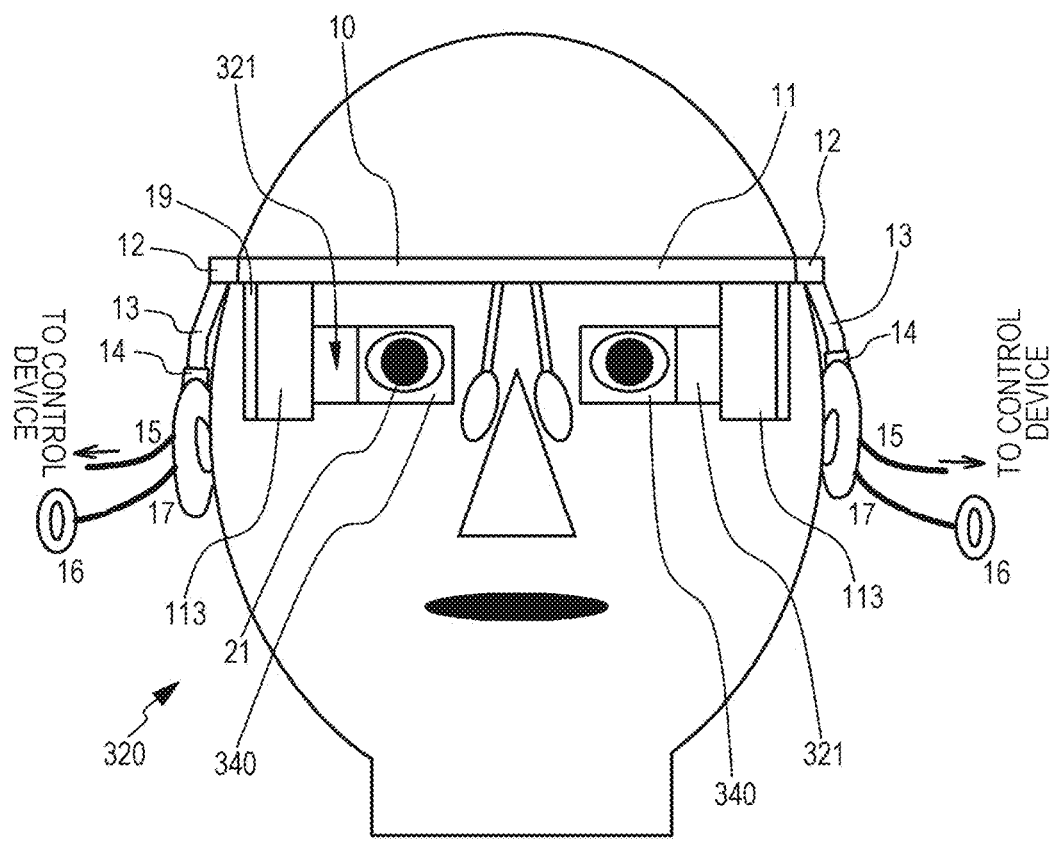
FIG. 8 is a schematic front view of the display apparatus of Example 3.

Example 3 is also a modification of the image display devices in Example 1. FIG. 7 is a schematic top view of a display apparatus of Example 3. FIG. 8 is a schematic front view of the display apparatus.

In Example 3, the optical devices 320 forming the image display devices 300 each include a first deflecting unit (not shown) formed with a first semi-transmissive mirror, a transparent member 321 such as a glass panel or a plastic panel, and a second deflecting unit 340 formed with a second semi-transmissive mirror. The housings 113 that house the image forming devices 111 and the optical systems 112 are attached to the front unit 11 with the attachment members 19, and the housings 114 that house the light reflecting members 151 are also attached to the front unit 11. Meanwhile, the second deflecting units 340 are attached to members 321.

In Example 3, light that has been emitted from an image forming device 111 (not shown in FIGS. 7 and 8) housed in a housing 113 and has passed through an optical system 112 (not shown in FIGS. 7 and 8) passes through the first deflecting unit, is reflected by a light reflecting member 151, reenters the first deflecting unit, and is deflected by the first deflecting unit. The light deflected by the first deflecting unit propagates in a member 321, is deflected by a second deflecting unit 340, and is emitted toward an eye 21 of the viewer.

The display apparatus of Example 3 has substantially the same configuration and structure as those of the display apparatus of Example 1 except for the above differences, and therefore, detailed explanation thereof is not provided herein.

EXAMPLE 4

Figure 9:
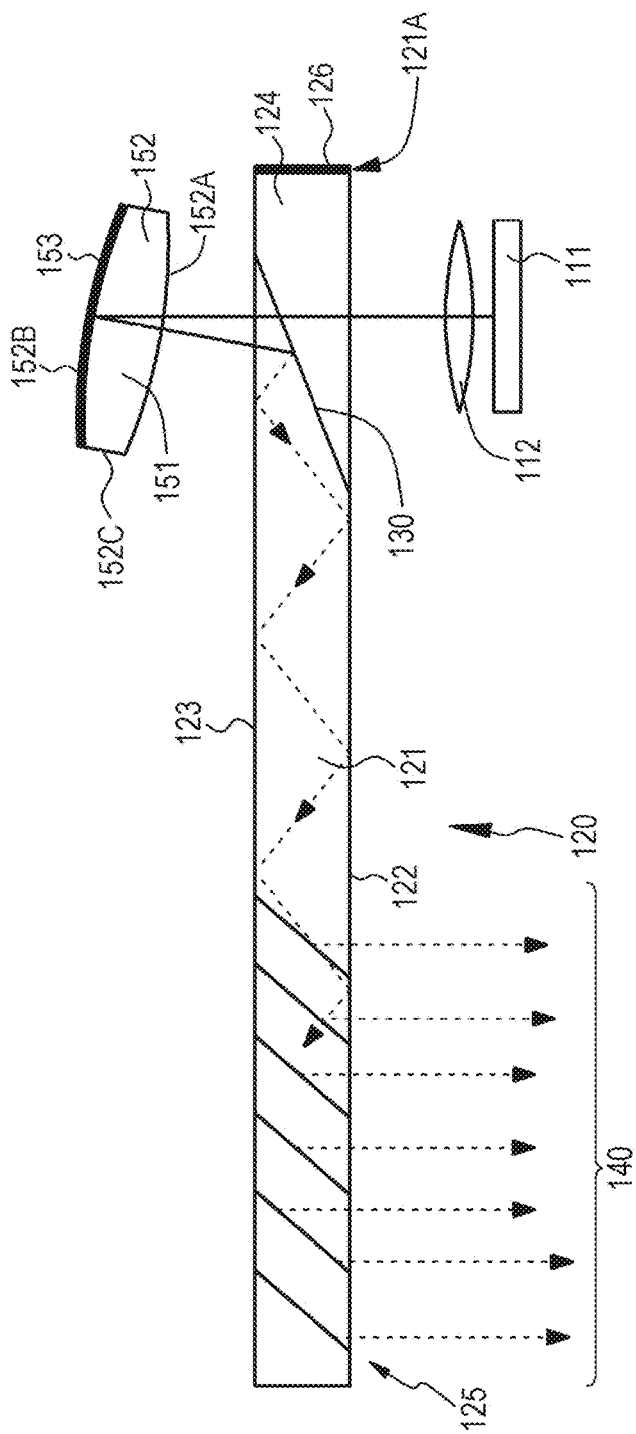
FIG. 9 is a conceptual diagram of a display apparatus of Example 4.
Figure 10:
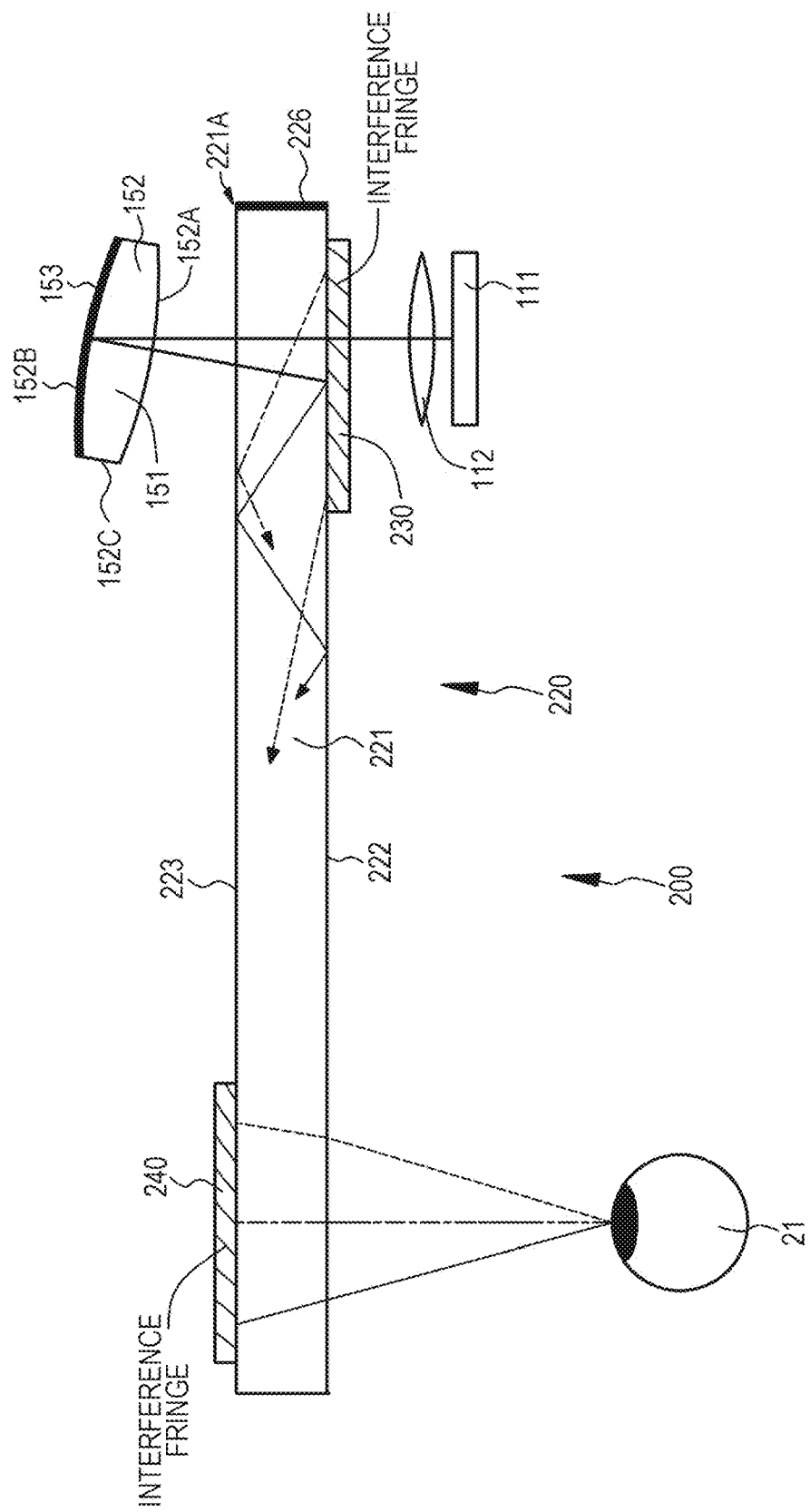
FIG. 10 is a conceptual diagram of a modification of the display apparatus of Example 4.

Example 4 is modifications of Examples 1 and 2. A display apparatus of Example 4 relates to a display apparatus with the second structure. In Example 4, as shown in the conceptual diagrams in FIGS. 9 and 10, the image forming devices 111 are placed on the viewer side of the light guide panel 121 or 221. The light reflecting members 151 are placed in a nonparallel manner with respect to the light guide panel 121 or 221. A display apparatus of Example 4 can have the same configuration and structure as those of the display apparatus of Example 1 except for these aspects, and therefore, detailed explanation thereof is not provided herein. The display apparatus of Example 3 may be a display apparatus with the second structure. As each display apparatus of Example 4 also includes the light reflecting members arranged so that the optical devices are interposed between the image forming devices and the light reflecting members, the degree of freedom in arranging the image forming devices can be increased. Specifically, the image forming devices are arranged parallel to the optical devices, and the light reflecting members and the optical devices are arranged in a nonparallel manner. With this arrangement, light that is emitted from the image forming devices and propagates inside the light guide panel toward the second deflecting units can be in an optimum reflected state (or deflected/reflected state) at the first deflecting units.

EXAMPLE 5

Figure 11:
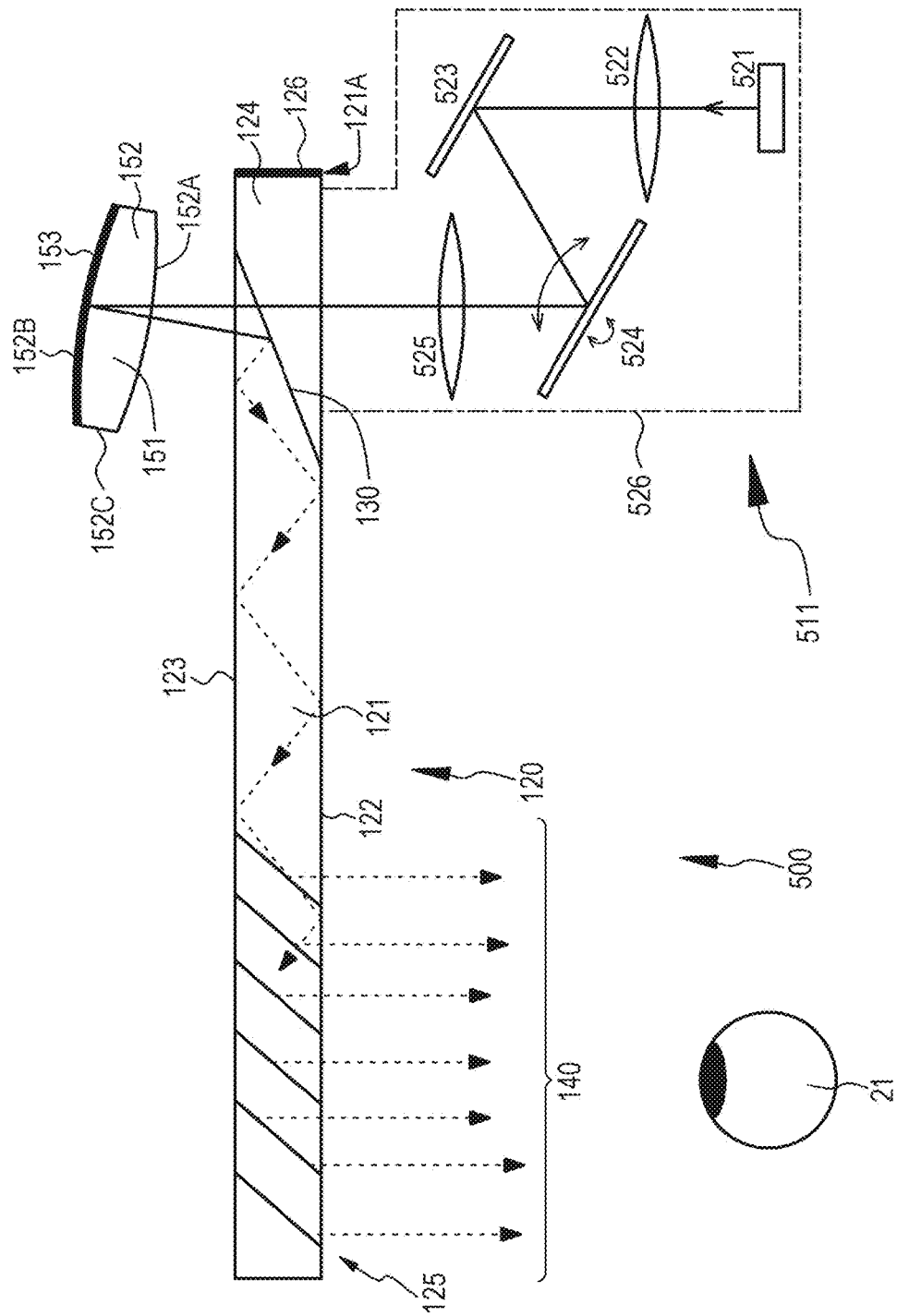
FIG. 11 is a conceptual diagram of an image display device in a display apparatus of Example 5.

Example 5 is a modification of Example 4. As shown in a conceptual diagram of an image display device 500 in a display apparatus (a head mounted display) of Example 5 in FIG. 11, an image forming device 511 in Example 5 is formed with an image forming device with the second structure. Specifically, the image forming device 511 includes a light source 521 and a scanning unit 524 that scans light emitted from the light source 521. More specifically, the image forming device 511 includes:

(a) the light source 521;

(b) a collimator optical system 522 that collimates light emitted from the light source 521;

(c) the scanning unit 524 that scans light emitted from the collimator optical system 522; and (d) a relay optical system 525 that relays and emits the light scanned by the scanning unit 524. The entire image forming device 511 is housed in a housing 526 (indicated by a dot-and-dash line in FIG. 11), an opening (not shown) is formed in the housing 526, and light is emitted outward from the relay optical system 525 through the opening. The housing 526 is detachably attached to a temple unit 13 with an attachment member 19.

The light source 521 is formed with a light emitting element that emits white light. Light emitted from the light source 521 enters the collimator optical system 522 having positive optical power in general, and then exits the collimator optical system 522. The light is then reflected by a total reflection mirror 523, and is horizontally and vertically scanned by the scanning unit 524 formed with a MEMS that has a two-dimensionally rotatable micromirror and is capable of two-dimensionally scanning incident light. The light is thus turned into a two-dimensional image, and virtual pixels (the number of pixels may be the same as that in Example 4, for example) are generated. Light emitted from the virtual pixels passes through the relay optical system 525 formed with a known relay optical system, and enters the optical device 120.

The optical device 120 that receives the light from the relay optical system 525, guides the light, and emits the light has the same configuration and structure as those of each optical device described in Example 4, and therefore, detailed explanation thereof is not provided herein. It goes without saying that the image display device described in Example 5 can be used in Examples 1 through 3.

EXAMPLE 6

Figure 12:
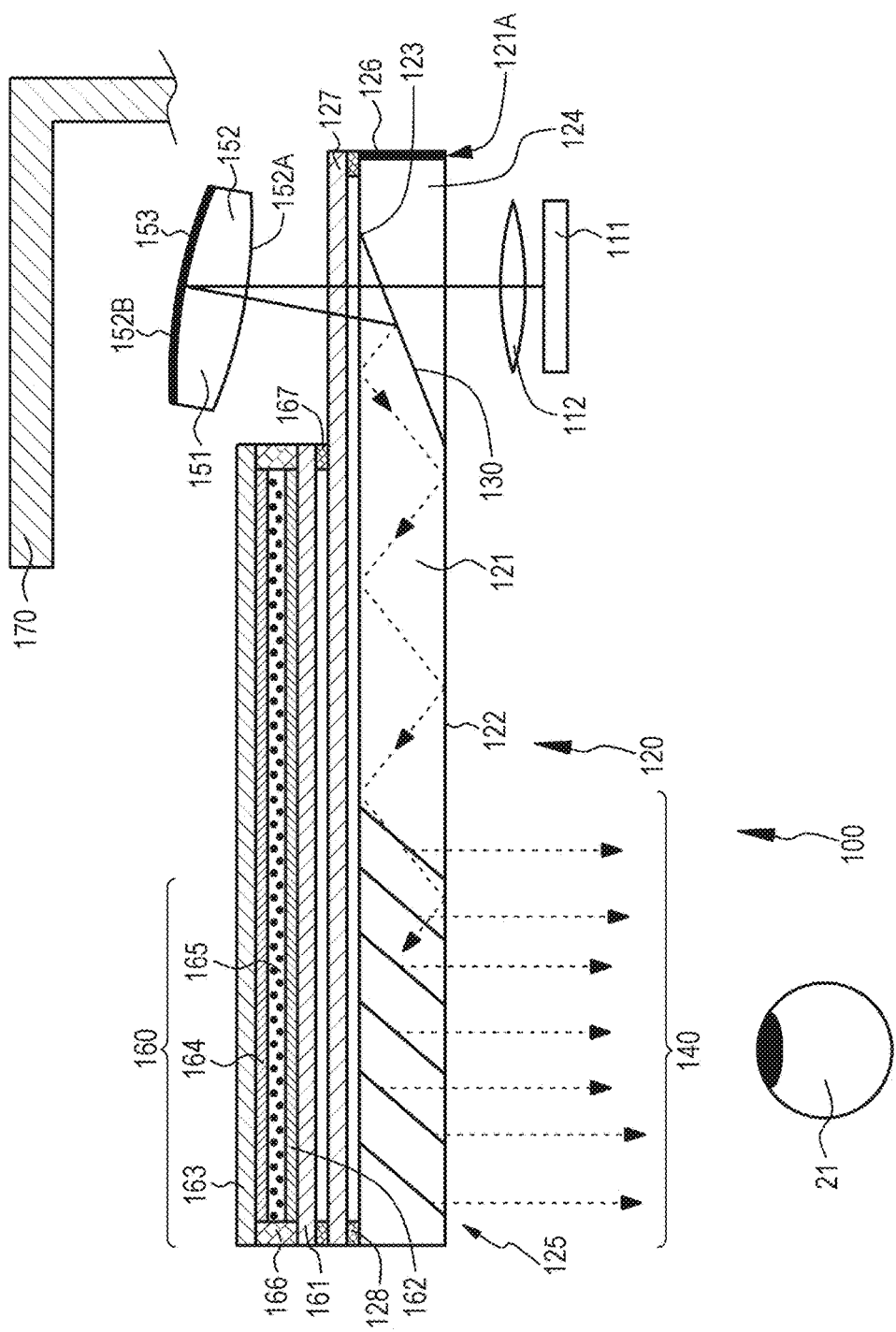
FIG. 12 is a conceptual diagram of a display apparatus of Example 6.
Figure 13:
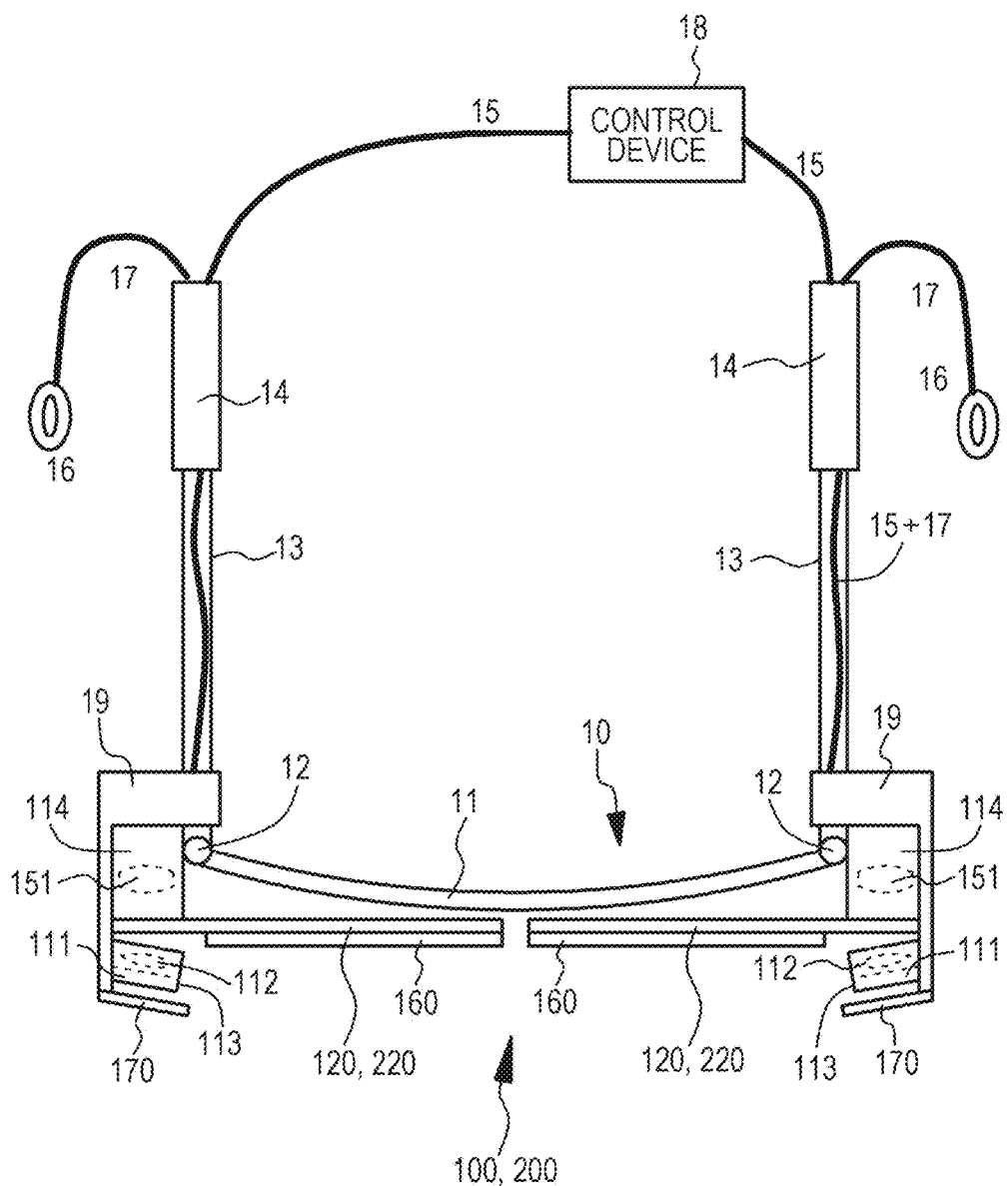
FIG. 13 is a schematic top view of the display apparatus of Example 6.
Figure 14A:
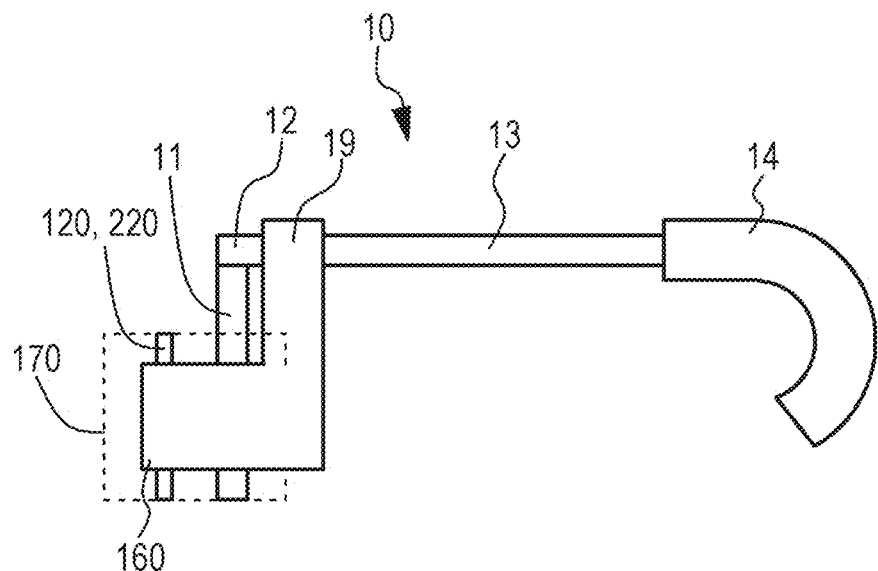
FIGS. 14A and 14B are a schematic side view of the display apparatus of Example 6, and a schematic front view of an optical device and a dimmer in the display apparatus of Example 6, respectively.
Figure 14B:
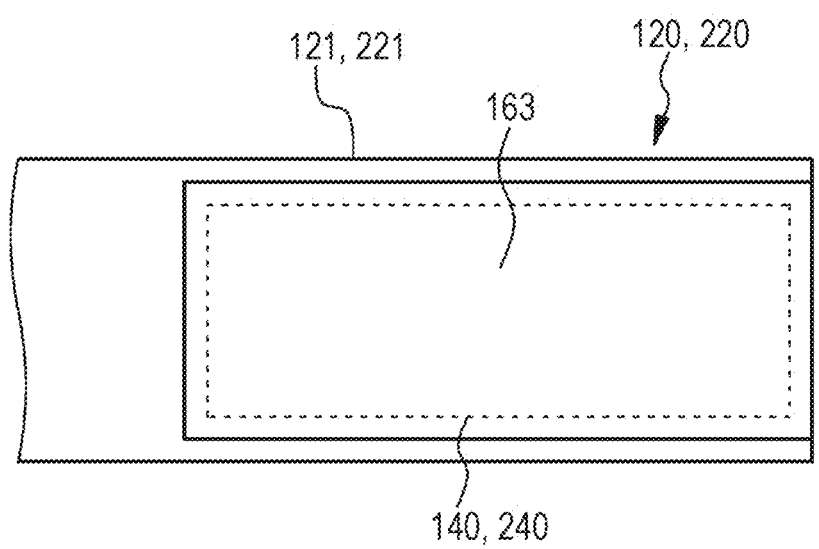

Example 6 is modifications of Examples 1 through 5. FIG. 12 is a conceptual diagram of a display apparatus of Example 6. FIG. 13 is a schematic top view of the display apparatus of Example 6. FIGS. 14A and 14B are a schematic side view of the display apparatus of Example 6, and a schematic front view of an optical device and a dimmer in the display apparatus of Example 6, respectively. Although the display apparatus shown in FIGS. 12, 13A, 13B, 14A, and 14B is based on the display apparatus of Example 1, it is of course possible to use a display apparatus of Examples 2 through 5 in this example.

In Example 6, a dimmer 160 that adjusts the amount of light entering from outside is placed in the region of an optical device (a light guide panel) facing at least an eye 21 of the viewer. That is, the dimmer 160 that adjusts the amount of light entering from outside is placed on the opposite side of the optical device 120, 220, or 320 from the viewer. Specifically, the dimmer 160 that is a kind of an optical shutter is secured to the optical device 120, 220, or 320 (specifically, a protecting member (a protecting panel) 127 protecting a light guide panel 121 or 221, or a second deflecting unit 340) with an adhesion member 167. The protecting member (protecting panel) 127 is attached to the second surface 123 or 223 of the light guide panel 121 or 221 with an adhesion member 128. The second deflecting unit 140 or 240 is located in a projection image of the dimmer 160.

The dimmer 160 in Example 6 is an optical shutter that has a light transmission control material layer 165 formed with a liquid crystal material layer. Specifically, the dimmer 160 includes:

a transparent first substrate 161 facing the optical device 120 and a transparent second substrate 163 located on the opposite side from the first substrate 161;

electrodes 162 and 164 formed on the first substrate 161 and the second substrate 163, respectively; and the light transmission control material layer 165 sealed between the first substrate 161 and the second substrate 163. Here, the first substrate 161 and the second substrate 163 are made of a plastic material. The first electrode 162 and the second electrode 164 are transparent electrodes made of an indium-tin oxide (ITO), and are formed based on a combination of PVD such as a sputtering technique and a lift-off technique. The light transmission control material layer 165 is specifically formed with a liquid crystal material layer made of a TN (twisted nematic) liquid crystal material. The first electrode 162 and the second electrode 164 are not patterned, and are so-called solid electrodes. The first electrode 162 and the second electrode 164 are connected to the control device 18 via connectors and wires (not shown). The outer edges of the two substrates 161 and 163 are sealed with a sealing agent 166. Further, the first substrate 161 of the dimmer 160 is bonded to the protecting member 127 (protecting the light guide panel 121) with the adhesion member 167. Polarizing films are attached to the outer surface of the first substrate 161 and the outer surface of the second substrate 163, but these polarizing films are not shown in the drawings. The first substrate 161 of the dimmer 160 has a smaller length than the light guide panel 121, and the first substrate 161 of the dimmer 160 is secured to the protecting member 127 with the adhesion member 167. The adhesion member 167 is provided at the outer edge of the first substrate 161. The same applies to the examples described later. Although the optical device 120 and the dimmer 160 are located in this order from the viewer side, but the dimmer 160 and the optical device 120 may be located in this order from the viewer side.

Figure 15A:
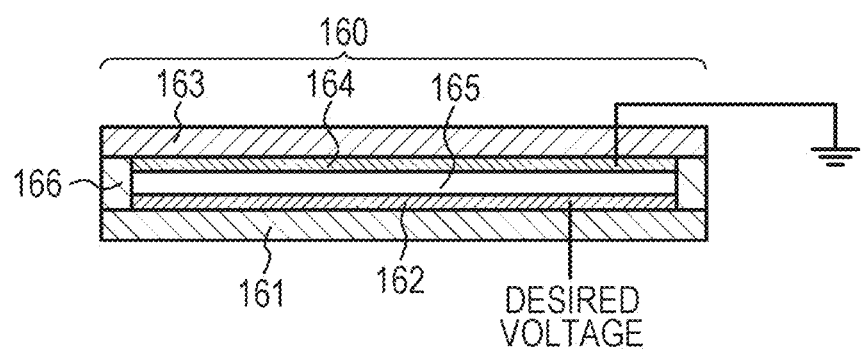
FIGS. 15A and 15B are schematic cross-sectional views of a dimmer, schematically showing a behavior of the dimmer in the display apparatus of Example 6.
Figure 15B:
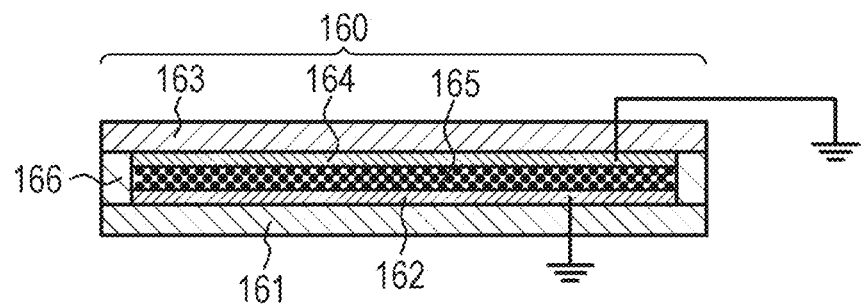

The light transmittance of the dimmer 160 can be controlled with voltages to be applied to the first electrode 162 and the second electrode 164. Specifically, when a voltage is applied to the first electrode 162 while the second electrode 164 is grounded, for example, the liquid-crystal alignment in the liquid crystal material layer that forms the light transmission control material layer 165 varies, and the light transmittance of the liquid crystal material layer changes (see FIGS. 15A and 15B). Voltages to be applied to the first electrode 162 and the second electrode 164 can be controlled by the viewer operating a control knob attached to the control device 18. Specifically, the viewer observes an image from the optical device 120, 220, or 320, and adjusts the light transmittance of the dimmer 160, to improve image contrast. As a result of various tests, it was found that the highest light transmittance of the dimmer 160 is preferably 50%, and the lowest light transmittance is preferably 30% or lower (more preferably, not lower than 1% and not higher than 30%).

In the display apparatus of Example 6, light blocking members 170 that block external light from entering the light reflecting members 151 are provided in the regions of the optical devices 120 to which light is emitted from the image forming devices, or specifically, in the regions where the first deflecting units 130 are placed. More specifically, the light blocking members 170 are placed on the outer sides of the light reflecting members 151 or the image forming devices 111, when seen from the viewer. Here, the regions of the optical devices 120 to which light is emitted from the image forming devices are included in images of the light blocking members 170 projected onto the optical devices 120. Also, images of the end portions of the dimmers 160 projected onto the optical devices 120 are included in images of the light blocking members 170 projected onto the optical devices 120. The light blocking members 170 are made of a non-transparent plastic material, for example, and are attached to the attachment members 19.

As the dimmers are provided in the display apparatus of Example 6, a problem of insufficient contrast in an image to be viewed by the viewer can be prevented. Such a problem is caused when the surroundings of the image display devices are extremely bright, or is caused depending on the contents of the displayed image. Furthermore, the light blocking members that block external light from entering the optical devices are provided in the regions of the optical devices to which light is emitted from the image forming devices. Accordingly, even if the amount of incident external light is changed by operating the dimmers, external light does not enter the regions of the optical devices to which light is emitted from the image forming devices, or specifically, external light does not enter the first deflecting units 130. Thus, undesired stray light or the like does not degrade image display quality in the display apparatus. Alternatively, only the dimmers may be employed, or only the light blocking members may be employed.

FIGS. 16, 17, 18, 19, and 20 are conceptual diagrams of modifications of the display apparatus of Example 6.

Figure 16:
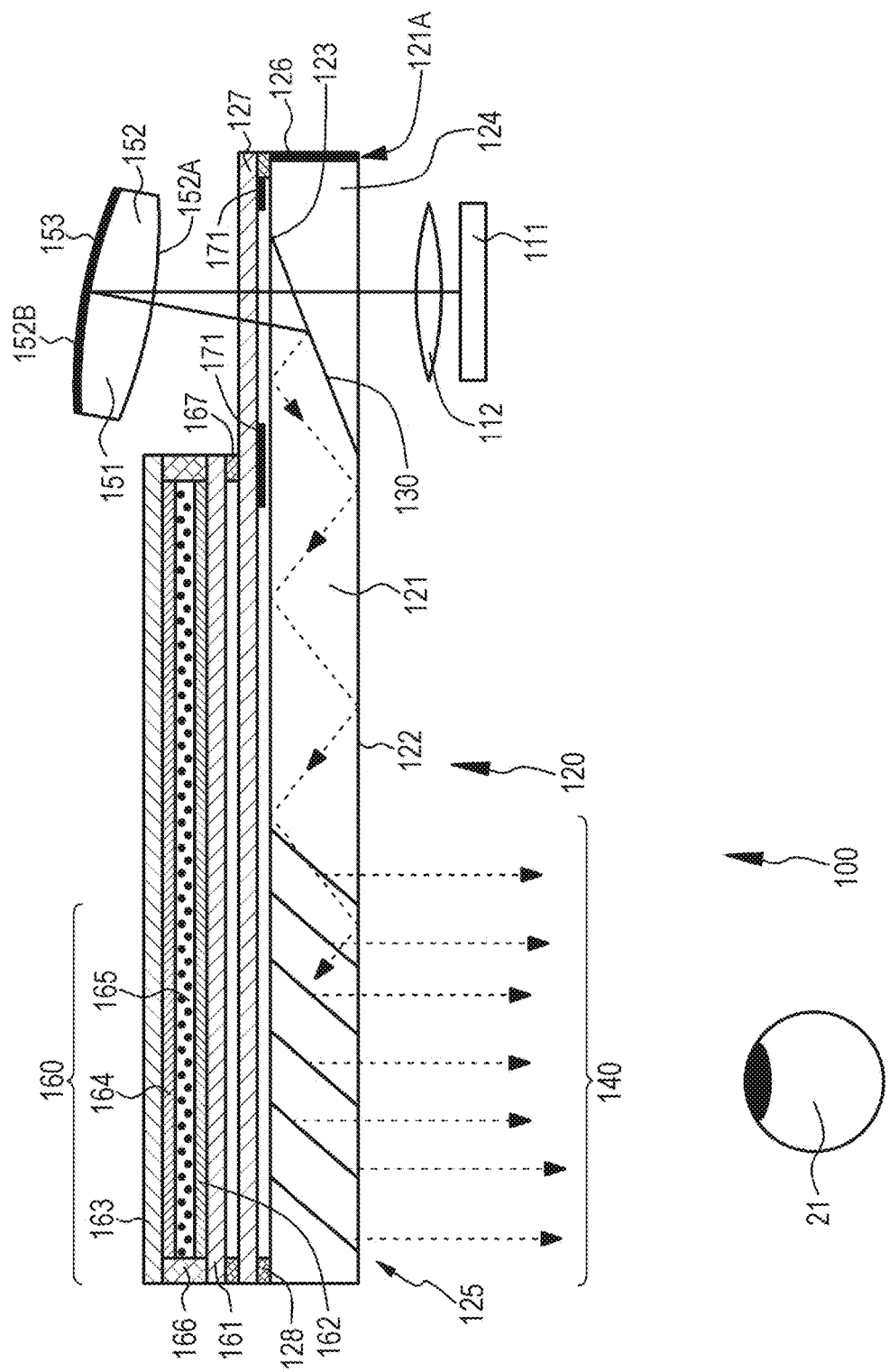
FIG. 16 is a conceptual diagram of a modification of the display apparatus of Example 6.

In the example shown in FIG. 16, light blocking members 171 are placed at portions of the optical devices 120, the portions being located on the opposite side of the optical devices 120 from the viewer. Specifically, the light blocking members 171 can be formed by performing printing with non-transparent ink on such regions of the optical devices 120 (specifically, the inner surfaces of the protecting members 127) that light from the image forming devices 111 and light from the light reflecting members 151 are not blocked. It is possible to combine the light blocking members 170 and the light blocking members 171. The light blocking members 171 may be formed on the outer surfaces of the protecting members 127.

Figure 17:
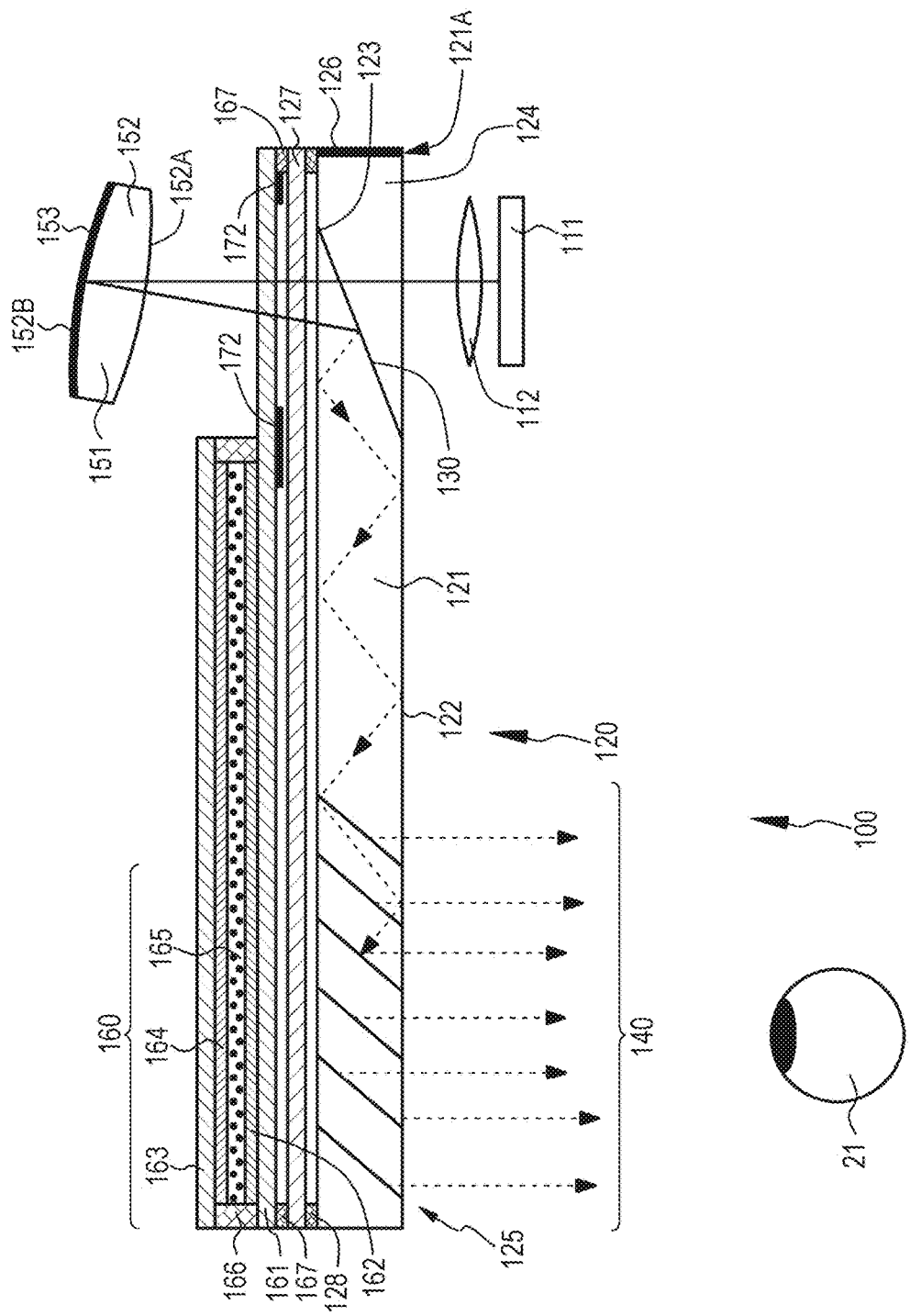
FIG. 17 is a conceptual diagram of another modification of the display apparatus of Example 6.
Figure 18:
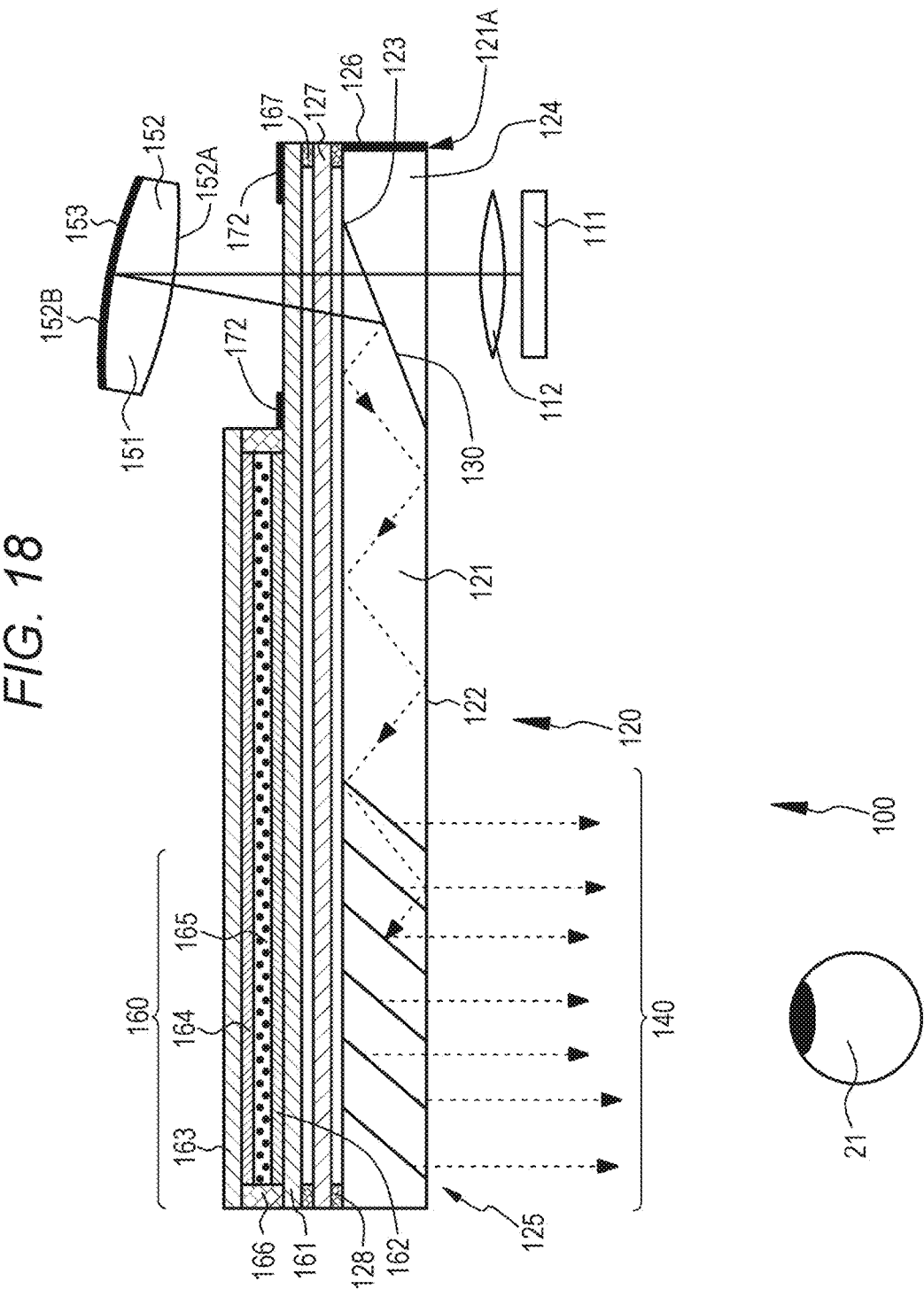
FIG. 18 is a conceptual diagram of another modification of the display apparatus of Example 6.

In the example shown in FIG. 17 or 18, light blocking members 172 are placed in the dimmers 160. Specifically, the light blocking members 172 can be formed by performing printing with non-transparent ink in the dimmers 160. In the example shown in FIG. 17, the light blocking members 172 are formed on the outer surfaces of the first substrates 161 of the dimmers 160. In the example shown in FIG. 18, the light blocking members 172 are formed on the inner surfaces of the first substrates 161 of the dimmers 160. The light blocking member 172 are formed in such regions that light from the image forming devices 111 and light from the light reflecting members 151 are not blocked. It is possible to combine the light blocking members 172 and the light blocking members 170, combine the light blocking members 172 and the light blocking members 171, or combine the light blocking members 172, the light blocking members 170, and the light blocking members 171.

Figure 19:
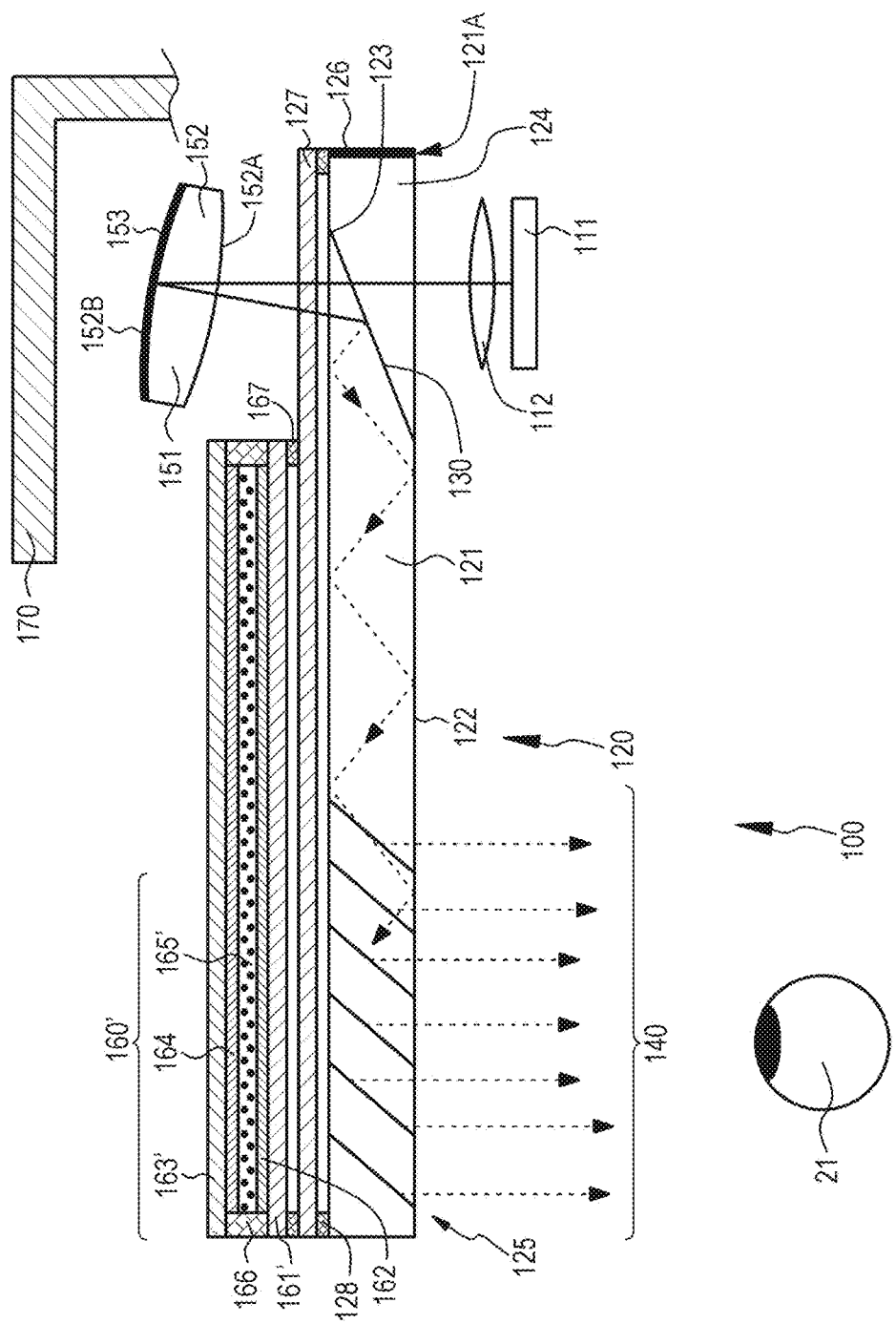
FIG. 19 is a conceptual diagram of yet another modification of the display apparatus of Example 6.

In the example shown in FIG. 19, a dimmer 160' is an optical shutter that has a light transmission control material layer 165' formed with an inorganic electroluminescence material layer. The material used to form the inorganic electroluminescence material layer is tungsten oxide ($WO_3$). The first substrate 161' and the second substrate 163' forming the dimmer 160' are transparent glass substrates made of soda-lime glass, white sheet glass, or the like, and the second substrate 163' is made thinner than the first substrate 161'. Specifically, the thickness of the second substrate 163' is 0.2 mm, and the thickness of the first substrate 161' is 0.4 mm. The first substrate 161' of the dimmer 160' is bonded to the protecting member 127 with an adhesive agent 167.

Figure 20:
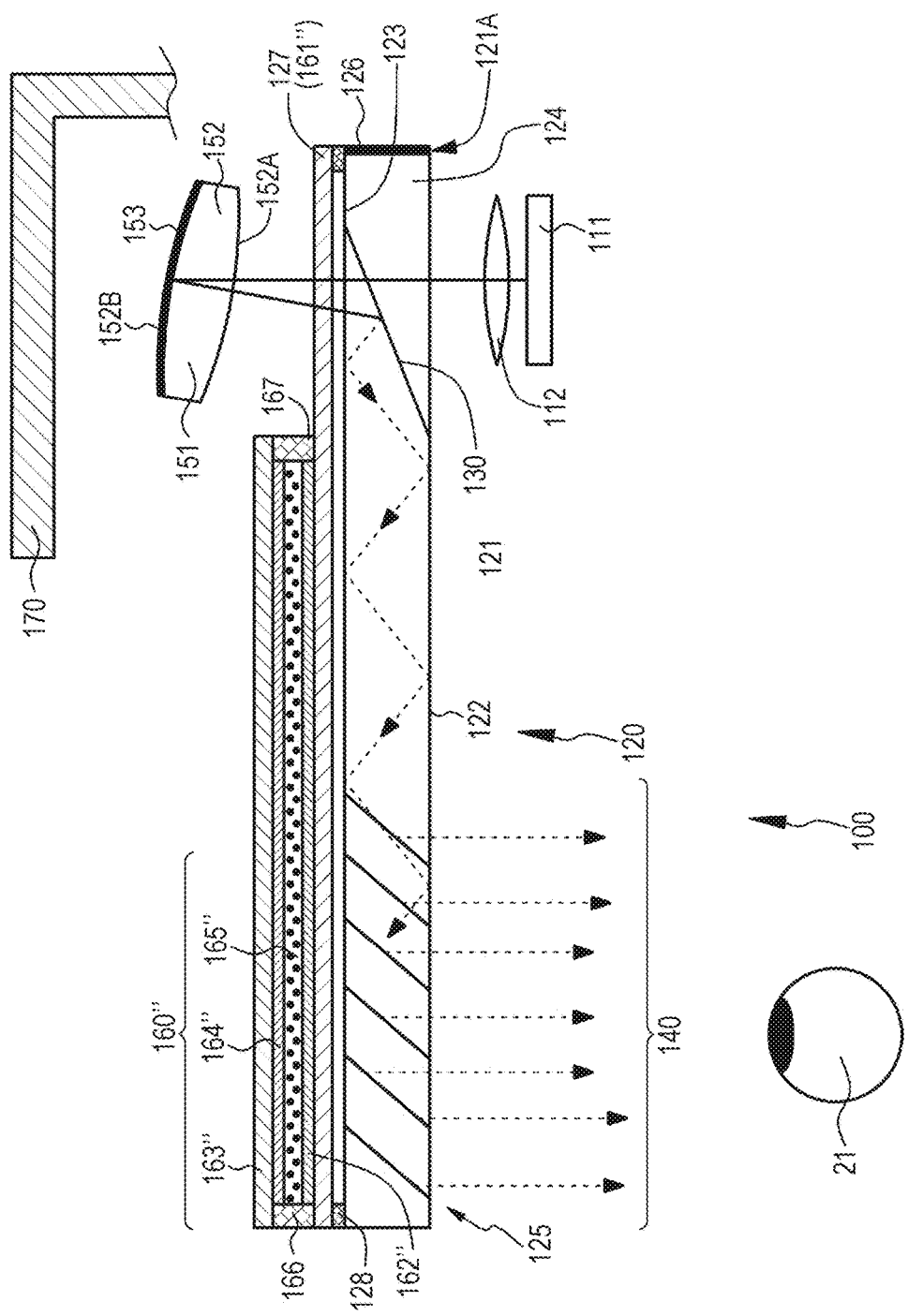
FIG. 20 is a conceptual diagram of still another modification of the display apparatus of Example 6.

In the example shown in FIG. 20, a dimmer 160" includes:

a first substrate 161" facing an optical device 120 and a second substrate 163" located on the opposite side from the first substrate 161";

electrodes 162" and 164" formed on the first substrate 161" and the second substrate 163", respectively; and a light transmission control material layer 165" sealed between the first substrate 161" and the second substrate 163". The first substrate 161" also serves as a member of the optical device 120 (specifically, the protecting member 127). That is, the first substrate 161" and the protecting member 127 are the same member that is shared. As described above, the first substrate 161" of the dimmer 160" also serves as a member (the protecting member 127) of the optical device 120. In other words, one (the first substrate 161") of the substrates of the dimmer 160 covers the first deflecting unit 130 or 230 and the second deflecting unit 140 or 240.

Accordingly, the total weight of the display apparatus can be reduced, and the user (viewer) of the display apparatus does not feel any discomfort.

EXAMPLE 7

Figure 21A:
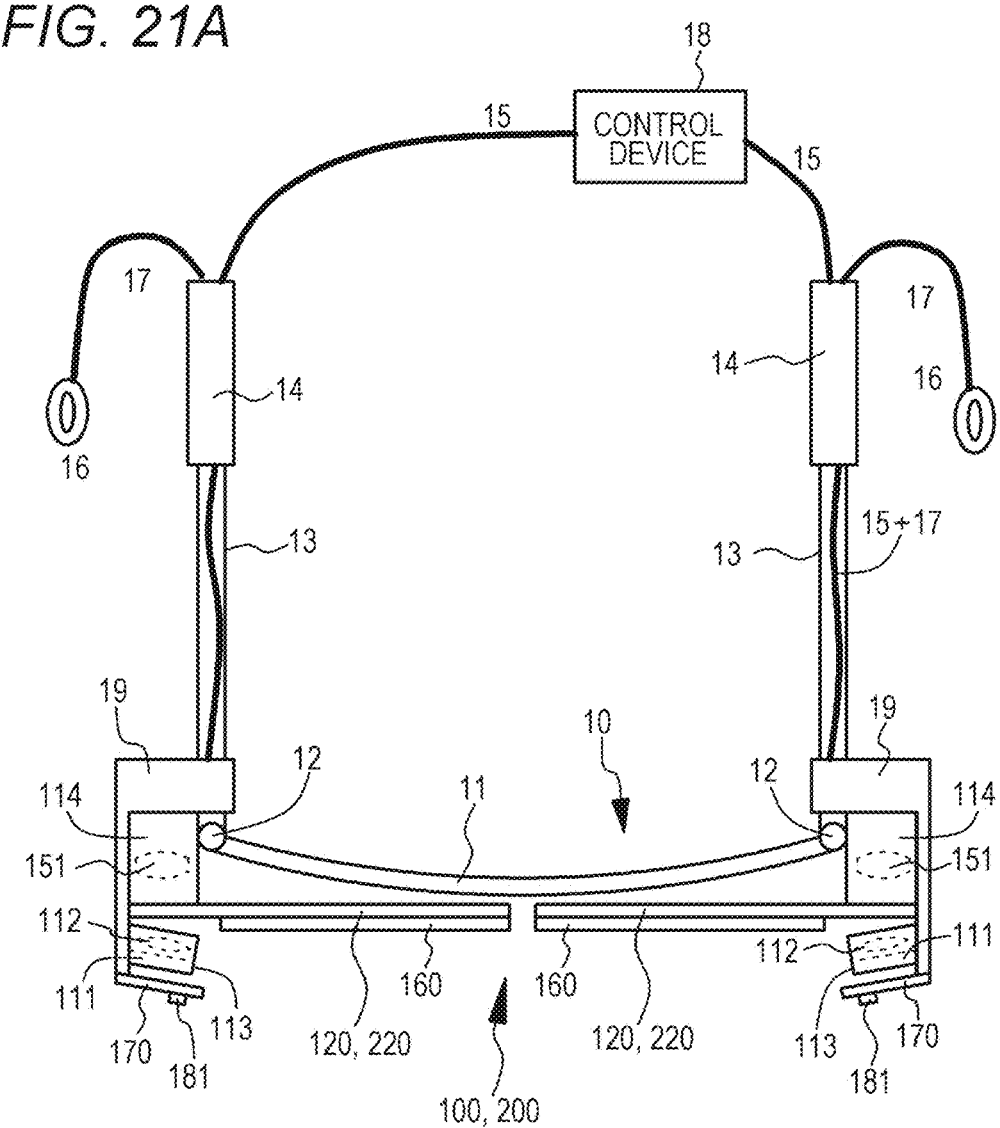
FIGS. 21A and 21B are a schematic top view of a display apparatus of Example 7, and a schematic view of a circuit that controls an illuminance sensor, respectively.
Figure 21B:
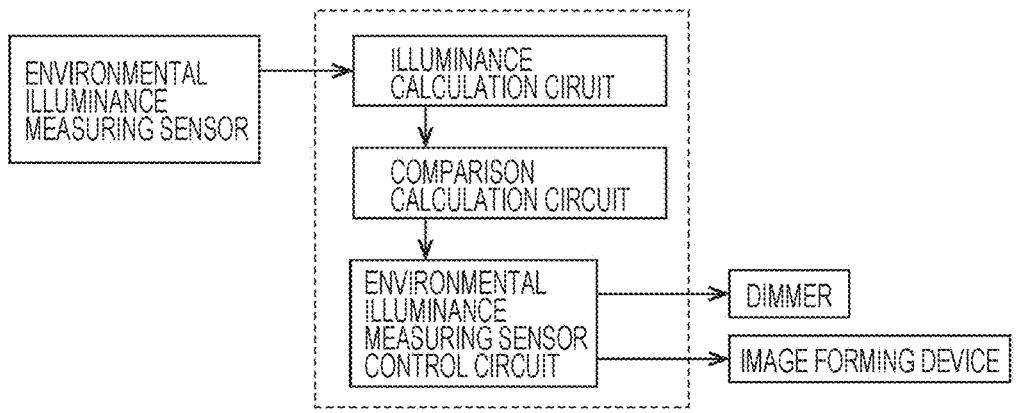

Example 7 is a modification of Example 6. FIG. 21A is a schematic top view of a display apparatus of Example 7. FIG. 21B is a schematic view of a circuit that controls illuminance sensors.

The display apparatus of Example 7 further includes illuminance sensors (environmental illuminance measuring sensors) 181 that measure the illuminance of the environment in which the display apparatus is placed, and controls the light transmittance of the dimmers 160 based on a result of measurement carried out by the illuminance sensors (environmental illuminance measuring sensors) 181. As well as the above or separately from the above, the display apparatus of Example 7 controls luminance of images to be formed by image forming devices 111 or 511 based on a result of measurement carried out by the illuminance sensors (environmental illuminance measuring sensors) 181. The environmental illuminance measuring sensors 181 each having a conventional configuration and structure are placed on the outer surfaces of the light blocking members 170, at the outer end portions of the optical devices 120, 220, or 320, or at the outer end portions of the dimmers, for example. The environmental illuminance measuring sensors 181 are connected to the control device 18 via connectors and wires (not shown). The control device 18 includes a circuit that controls the environmental illuminance measuring sensors 181. The circuit that controls the environmental illuminance measuring sensors 181 includes an illuminance calculation circuit that receives measurement values from the environmental illuminance measuring sensors 181 and determines illuminance, a comparison calculation circuit that compares the value of the illuminance determined by the illuminance calculation circuit with a reference value, and an environmental illuminance measuring sensor control circuit that controls the dimmers 160 and/or the image forming devices 111 or 511 based on the value determined by the comparison calculation circuit. These circuits can be formed with known circuits. In controlling the dimmers 160, the circuit controls light transmittance of the dimmers 160. In controlling the image forming devices 111 or 511, the circuit controls luminance of images to be formed by the image forming devices 111 or 511. The control on light transmittance at the dimmers 160 and the control on luminance of images at the image forming devices 111 or 511 may be performed independently of each other, or may be performed in association with each other.

For example, when the result of measurement carried out by the illuminance sensors (environmental illuminance measuring sensors) 181 is equal to or greater than a predetermined value (a first illuminance measurement value), the light transmittance of the dimmers 160 is adjusted to a predetermined value (first light transmittance) or lower. When the result of measurement carried out by the illuminance sensors (environmental illuminance measuring sensors) 181 is equal to or smaller than a predetermined value (a second illuminance measurement value), on the other hand, the light transmittance of the dimmers 160 is adjusted to a predetermined value (second light transmittance) or higher. Here, the first illuminance measurement value may be 10 lux, the first light transmittance may be any value between 1% and 30%, the second illuminance measurement value may be 0.01 lux, and the second light transmittance may be any value between 51% and 99%.

In a case where the display apparatus includes an imaging device, the illuminance sensors (environmental illuminance measuring sensors) 181 can be formed with the exposure-measuring light receiving elements in the imaging device.

In a display apparatus of Example 7 or Example 8, which will be described next, the light transmittance of the dimmers is controlled based on a result of measurement carried out by the illuminance sensors (environmental illuminance measuring sensors), the luminance of images to be formed by the image forming device is controlled based on a result of measurement carried out by the illuminance sensors (environmental illuminance measuring sensors), the light transmittance of the dimmers is controlled based on a result of measurement carried out by second illuminance sensors (transmitted-light illuminance measuring sensors), and the luminance of images to be formed by the image forming device is controlled based on a result of measurement carried out by second illuminance sensors (transmitted-light illuminance measuring sensors). Accordingly, images to be viewed by the viewer can have high contrast, and the image viewing condition can be optimized depending on the illuminance of the environment in which the display apparatus is placed.

EXAMPLE 8

Figure 22A:
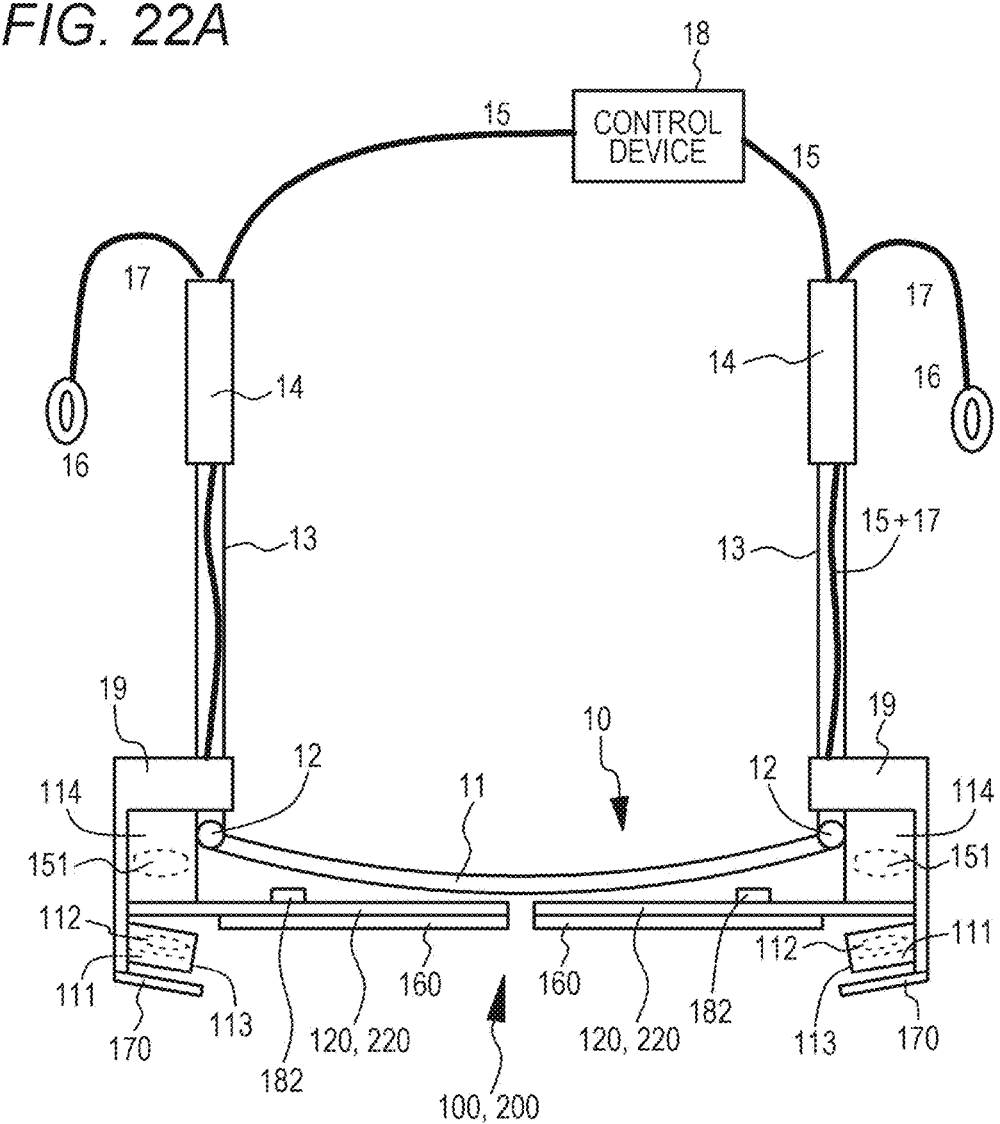
FIGS. 22A and 22B are a schematic top view of a display apparatus of Example 8, and a schematic view of a circuit that controls an illuminance sensor, respectively.
Figure 22B:
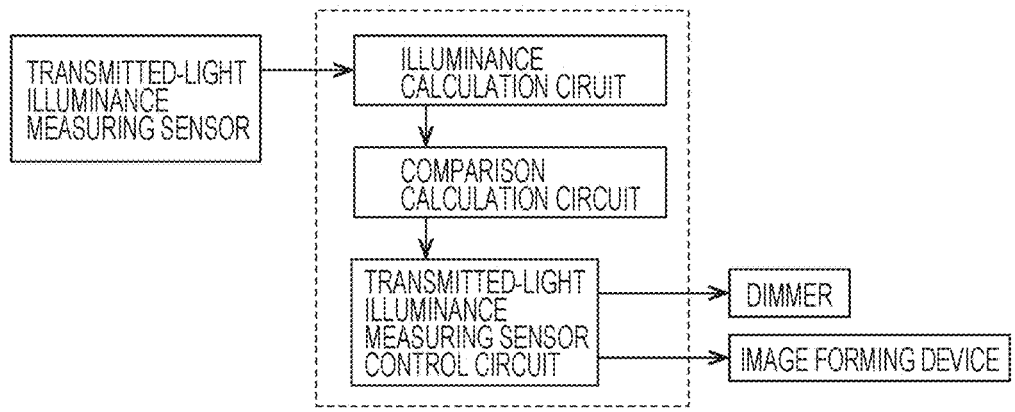

Example 8 is modifications of Examples 6 and 7. FIG. 22A is a schematic top view of a display apparatus of Example 8. FIG. 22B is a schematic view of a circuit that controls illuminance sensors.

The display apparatus of Example 8 further includes second illuminance sensors (transmitted-light illuminance measuring sensors) 182 that measure illuminance based on light transmitted from an external environment through the dimmers, or determine whether ambient light has been transmitted through the dimmers and been adjusted to a desired illuminance before incidence. The display apparatus of Example 8 controls light transmittance of the dimmers 160 based on a result of measurement carried out by the second illuminance sensors (transmitted-light illuminance measuring sensors) 182. As well as the above or separately from the above, the display apparatus of Example 8 controls luminance of images to be formed by image forming devices 111 or 511 based on a result of measurement carried out by the second illuminance sensors (transmitted-light illuminance measuring sensors) 182. The transmitted-light illuminance measuring sensors 182 each having a known configuration and structure are placed on the viewer side of the optical devices 120, 220, or 320. Specifically, the transmitted-light illuminance measuring sensors 182 may be placed on the viewer-side surfaces of the light guide panels 121 or 221. The transmitted-light illuminance measuring sensors 182 are connected to the control device 18 via connectors and wires (not shown). The control device 18 includes a circuit that controls the transmitted-light illuminance measuring sensors 182. The circuit that controls the transmitted-light illuminance measuring sensors 182 includes an illuminance calculation circuit that receives measurement values from the transmitted-light illuminance measuring sensors 182 and determines illuminance, a comparison calculation circuit that compares the value of the illuminance determined by the illuminance calculation circuit with a reference value, and an transmitted-light illuminance measuring sensor control circuit that controls the dimmers 160 and/or the image forming devices 111 or 511 based on the value determined by the comparison calculation circuit. These circuits can be formed with known circuits. In controlling the dimmers 160, the circuit controls light transmittance of the dimmers 160. In controlling the image forming devices 111 or 511, the circuit controls luminance of images to be formed by the image forming devices 111 or 511. The control on light transmittance at the dimmers 160 and the control on luminance of images at the image forming devices 111 or 511 may be performed independently of each other, or may be performed in association with each other. Further, in a case where a result of measurement carried out by the transmitted-light illuminance measuring sensors 182 is not adjusted to a desired illuminance in view of the illuminance from the environmental illuminance measuring sensors 181, or where a result of measurement carried out by the transmitted-light illuminance measuring sensors 182 is not the desired illuminance, or in a case where even finer illuminance adjustment is desired, the light transmittance of the dimmers should be adjusted while the value at the transmitted-light illuminance measuring sensors 182 is monitored.

The second illuminance sensors (transmitted-light illuminance measuring sensors) 182 of Example 8 may be combined with the environmental illuminance measuring sensors 181 of Example 7. In that case, various tests may be conducted, and the control on light transmittance at the dimmers 160 and the control on luminance of images at the image forming devices 111 or 511 may be performed independently of each other or may be performed in association with each other.

Although the present disclosure has been described so far based on preferred examples, the present disclosure is not limited to those examples. The configurations and structures of the display apparatuses (head mounted displays), the image display devices, and the light reflecting members, which have been described in Examples, are merely examples and can be modified as appropriate. For example, a surface-relief hologram (see US 2004/0062505 A1) may be provided on each light guide panel. In each optical device 220, the diffraction grating elements may be formed with transmissive diffraction grating elements, or one of the first and second deflecting units may be formed with a reflective diffraction grating element while the other one is formed with a transmissive diffraction grating element. Alternatively, the diffraction grating elements may be reflective blazed diffraction grating elements.

The present disclosure can also be embodied in the structures described below.

(Display Apparatus)

[A01] A display apparatus including:

(a) a frame to be mounted on the head of a viewer; and (b) an image display device attached to the frame, wherein the image display device includes:

(A) an image forming device; and (B) an optical device that guides an image from the image forming device to an eye of the viewer, the optical device includes: a first deflecting unit that deflects the image from the image forming device; and a second deflecting unit that deflects the image deflected by the first deflecting unit, toward the eye of the viewer, a light reflecting member is further provided to face the image forming device, with the optical device being interposed between the image forming device and the light reflecting member, and light emitted from the image forming device passes through the optical device, is reflected by the light reflecting member, reenters the optical device, and is deflected by the first deflecting unit.

[A02] The display apparatus of [A01], wherein the light reflecting member is formed with an optical member that includes a first surface into and from which light from the image forming device is guided and emitted, and a second surface that is located on the opposite side from the first surface, a light reflecting layer being formed on the second surface.

[A03] The display apparatus of [A02], wherein the first surface and the second surface are formed with adjustable surfaces.

[A04] The display apparatus of one of [A01] through [A03], wherein
the optical device includes:
(B-1) a light guide panel that causes incident light to propagate therein by total reflection, and emits the light;
(B-2) the first deflecting unit; and
(B-3) the second deflecting unit that deflects, more than once, the light that has propagated inside the light guide panel by total reflection, and causes the light to exit the light guide panel,
the light reflecting member is placed to face the image forming device, with the light guide panel being interposed between the light reflecting member and the image forming device, and
light emitted from the image forming device passes through the light guide panel, is reflected by the light reflecting member, reenters the light guide panel, and is deflected by the first deflecting unit so as to be totally reflected inside the light guide panel.

[A05] The display apparatus of [A04], wherein the light reflecting member is placed on the viewer side of the light guide panel.

[A06] The display apparatus of [A04], wherein the image forming device is placed on the viewer side of the light guide panel.

[A07] The display apparatus of one of [A04] through [A06], wherein the image forming device is nonparallel to the light guide panel.

[A08] The display apparatus of one of [A04] through [A06], wherein the light reflecting member is nonparallel to the light guide panel.

[A09] The display apparatus of one of [A04] through [A08], wherein the end portion of the light guide panel on the side of the first deflecting unit is subjected to quenching.

[A10] The display apparatus of one of [A01] through [A09], wherein the image forming device is formed with an organic electroluminescence display device or a light-emitting display device.

[B01] The display apparatus of one of [A01] through [A10], wherein a dimmer that adjusts the amount of light entering from outside is placed in the region of the optical device facing at least the eye of the viewer.

[B02] The display apparatus of [B01], wherein the dimmer includes:
a first substrate that faces the optical device, and a second substrate located on the opposite side from the first substrate;
electrodes formed on the first substrate and the second substrate, respectively; and
a light transmission control material layer sealed between the first substrate and the second substrate.

[B03] The display apparatus of [B02], wherein the first substrate also serves as a member of the optical device.

[B04] The display apparatus of [B02] or [B03], wherein the second substrate is thinner than the first substrate.

[B05] The display apparatus of one of [B01] through [B04], wherein the dimmer is an optical shutter that has a light transmission control material layer formed with a liquid crystal material layer.

[B06] The display apparatus of one of [B01] through [B04], wherein the dimmer is an optical shutter that has a light transmission control material layer formed with an inorganic electroluminescence material layer.

[B07] The display apparatus of one of [B01] through [B06], further including an illuminance sensor that measures illuminance of the environment in which the display apparatus is placed,
wherein light transmittance of the dimmer is controlled or luminance of an image to be formed by the image forming device is controlled based on a result of the measurement carried out by the illuminance sensor.

[B08] The display apparatus of one of [B01] through [B07], further including a second illuminance sensor that measures illuminance based on light transmitted from an external environment through the dimmer,
wherein light transmittance of the dimmer is controlled and/or luminance of an image to be formed by the image forming device is controlled based on a result of the measurement carried out by the second illuminance sensor.

[B09] The display apparatus of [B08], wherein the second illuminance sensor is placed on the viewer side of the optical device.

[B10] The display apparatus of one of [B01] through [B09], wherein the first deflecting unit and the second deflecting unit are covered with one of the substrates forming the dimmer.

[B11] The display apparatus of one of [B01] through [B10], wherein the second deflecting unit is located in a projection image of the dimmer, or the dimmer is located in a projection image of the second deflecting unit.

[C01] The display apparatus of one of [A01] through [B11], wherein a light blocking member that blocks external light from entering the optical device is provided on the opposite side of the optical device from the viewer.

[C02] The display apparatus of one of [A01] through [B11], wherein a light blocking member that blocks external light from entering the optical device is provided in a region of the optical device to which light is emitted from the image forming device.

[C03] The display apparatus of one of [C01] or [C02], wherein the region of the optical device to which light is emitted from the image forming device is included in an image of the light blocking member projected onto the optical device.

[C04] The display apparatus of one of [C01] through [C03], wherein the light blocking member is provided on the opposite side of the optical device from the viewer, and is located at a distance from the optical device.

[C05] The display apparatus of one of [C01] through [C04], wherein the light blocking member is provided at a portion of the optical device, the portion being located on the opposite side of the optical device from the viewer.

[C06] The display apparatus of one of [C01] through [C05], wherein
the light blocking member that blocks external light from entering the optical device is provided in a region of the optical device to which light is emitted from the image forming device, and an image of an end portion of the dimmer projected onto the optical device is included in an image of the light blocking member projected onto the optical device.

[C07] The display apparatus of one of [B01] through [B11], wherein
a light blocking member that blocks external light from entering the optical device is provided in a region of the optical device to which light is emitted from the image forming device, and
the light blocking member is attached to the dimmer.

REFERENCE SIGNS LIST

10 Frame
11 Front unit
12 Hinge
13 Temple unit
14 End cover
15 Wire (signal wire, power wire, or the like)
16 Headphone unit
17 Headphone wire
18 Control device (control circuit)
19 Attachment member
21 Eye of a viewer
100, 200, 300, 500 Image display device
111, 511 Image forming device
112, 525 Optical system
113, 114, 526 Housing
120, 220, 320 Optical device (light guiding unit)
121, 221 Light guide panel
321 Transparent member
122, 222 First surface of the light guide panel
123, 223 Second surface of the light guide panel
121A End portion of the light guide panel
124, 125 Part of the light guide panel
126 Light absorbing layer
127 Protecting member (protecting panel)
128 Adhesion member
130 First deflecting unit
140, 340 Second deflecting unit
230 First deflecting unit (first diffraction grating member)
240 Second deflecting unit (second diffraction grating member)
151 Light reflecting member
152 Optical member
152A First surface of the light reflecting member
152B Second surface of the light reflecting member
152C Side surface of the light reflecting member
153 Light reflecting layer
521 Light source
522 Collimator optical system
523 Total reflection mirror
524 Scanning unit
525 Relay optical system
160, 160', 160" Dimmer
161, 161', 161" First substrate
162, 162" First electrode
163, 163', 163" Second substrate
164, 164" Second electrode
165, 165', 165" Light transmission control material layer
166 Sealing agent
167 Adhesion member
170, 171, 172 Light blocking member
181 Illuminance sensor (environmental illuminance measuring sensor)
182 Second illuminance sensor (transmitted-light illuminance measuring sensor)

The invention claimed is:
1. A display apparatus comprising:
an image forming device; and
an optical device configured to guide an image from the image forming device to an eye of a viewer via a light reflecting member,
wherein the optical device includes:
a first deflecting unit configured to deflect the image from the image forming device; and
a second deflecting unit configured to deflect the image deflected by the first deflecting unit, toward the eye of the viewer,
wherein the light reflecting member is formed with an optical member including a first surface into and from which light from the image forming device is guided and emitted, and a second surface located on the opposite side from the first surface, a light reflecting layer being formed on the second surface,
wherein the first surface and the second surface are formed with adjustable surfaces and
wherein the adjustable surfaces are asymmetrical in an x-z plane and are symmetrical in a y-z plane, wherein an axis of the light reflecting member that extends through a light reflecting member incidence center point and is parallel to an axis of the optical device from the first deflecting unit to the second deflecting unit is an x-axis and a normal line of the light reflecting member that extends through the light reflecting member incidence center point is a z-axis, and
wherein interference fringes are formed in at least one of the first deflecting unit and the second deflecting unit.

2. The display apparatus according to claim 1, wherein the optical device includes:
(B-1) a light guide panel configured to cause incident light to propagate therein by total reflection, and emit the light;
(B-2) the first deflecting unit; and
(B-3) the second deflecting unit configured to deflect, more than once, the light having propagated inside the light guide panel by total reflection, and cause the light to exit the light guide panel,
the light reflecting member is placed to face the image forming device, with the light guide panel being interposed between the light reflecting member and the image forming device, and
light emitted from the image forming device passes through the light guide panel, is reflected by the light reflecting member, reenters the light guide panel, and is deflected by the first deflecting unit so as to be totally reflected inside the light guide panel.

3. The display apparatus according to claim 2, wherein the light reflecting member is placed on the viewer side of the light guide panel.

4. The display apparatus according to claim 2, wherein the image forming device is placed on the viewer side of the light guide panel.

5. The display apparatus according to claim 2, wherein the image forming device is nonparallel to the light guide panel.

6. The display apparatus according to claim 2, wherein the light reflecting member is nonparallel to the light guide panel.

7. The display apparatus according to claim 2, wherein the end portion of the light guide panel on the side of the first deflecting unit is subjected to quenching.

8. The display apparatus according to claim 1, wherein the image forming device is formed with one of an organic electroluminescence display device and a light-emitting display device.

9. The display apparatus according to claim 1, wherein the light reflecting member is configured to face the image forming device, with the optical device being interposed between the image forming device and the light reflecting member.

10. The display apparatus according to claim 1, wherein light emitted from the image forming device passes through the optical device, is reflected by the light reflecting member, reenters the optical device, is deflected by the first deflecting unit to the second deflecting unit and is deflected by the second deflecting unit toward the eye of the viewer.

11. The display apparatus according to claim 1, wherein the interference fringes have a tilt angle.

12. The display apparatus according to claim 1, wherein the interference fringes satisfy a Bragg's condition.

13. The display apparatus according to claim 12, wherein the Bragg's condition satisfies an equation shown below:

$$m \cdot \lambda = 2 \cdot d \cdot \sin(\theta)$$

where m represents a positive integer, $\lambda$ represents a wavelength, d represents a pitch in a grating plane (the intervals in a virtual plane including the interference fringes in the normal direction), and $\theta$ represents an angle complementary with an incident angle with respect to the interference fringes.

* * * * *